(12) United States Patent
Andrade Dias

(10) Patent No.: US 11,554,633 B2
(45) Date of Patent: Jan. 17, 2023

(54) CLOSED LOOP FEEDBACK CONTROL AND DIAGNOSTICS OF A TRANSPORT CLIMATE CONTROL SYSTEM

(71) Applicant: THERMO KING LLC, Minneapolis, MN (US)

(72) Inventor: Marcelo Andrade Dias, Lakeville, MN (US)

(73) Assignee: THERMO KING LLC, Minneapolis, MN (US)

( * ) Notice: Subject to any disclaimer, the term of this patent is extended or adjusted under 35 U.S.C. 154(b) by 245 days.

(21) Appl. No.: 16/998,795

(22) Filed: Aug. 20, 2020

(65) Prior Publication Data
US 2022/0055445 A1 Feb. 24, 2022

(51) Int. Cl.
*B60H 1/00* (2006.01)

(52) U.S. Cl.
CPC ..... *B60H 1/00735* (2013.01); *B60H 1/00014* (2013.01); *B60H 1/00428* (2013.01); *B60H 1/00792* (2013.01); *B60H 1/00878* (2013.01); *B60H 1/00978* (2013.01)

(58) Field of Classification Search
CPC .......... B60H 1/00735; B60H 1/00014; B60H 1/00428; F25B 2600/024; F25B 2700/15; F25B 49/022
See application file for complete search history.

(56) References Cited

U.S. PATENT DOCUMENTS

| 7,290,989 B2 | 11/2007 | Jayanth |
| 8,692,398 B2 | 4/2014 | Neddermeyer, III et al. |
| 10,465,551 B2 | 11/2019 | Maalouf et al. |

(Continued)

FOREIGN PATENT DOCUMENTS

| CN | 104272034 | 1/2015 |
| EP | 1245912 | 10/2002 |

(Continued)

OTHER PUBLICATIONS

Extended European Search Report, issued in the corresponding European patent application No. 21192068.1, dated Jan. 20, 2022, 7 pages.

*Primary Examiner* — Nelson J Nieves
(74) *Attorney, Agent, or Firm* — Hamre, Schumann, Mueller & Larson, P.C.

(57) ABSTRACT

A closed loop feedback control and diagnostics system for a transport climate control system is provided. The closed loop feedback control and diagnostics system includes a plurality of source current sensors configured to monitor current received from a high voltage three-phase AC power source. The closed loop feedback control and diagnostics system also includes a plurality of compressor current sensors configured to monitor current drawn by an electrically powered compressor of the transport climate control system. The closed loop feedback control and diagnostics system also includes a controller configured to receive source current signals from each of the plurality of source current sensors, configured to receive compressor current signals from each of the plurality of compressor current sensors, and configured to control operation of the transport climate control system based on the received source current signals and the received compressor current signals.

15 Claims, 11 Drawing Sheets

(56) References Cited

U.S. PATENT DOCUMENTS

| | | | |
|---|---|---|---|
| 10,520,234 B2 | 12/2019 | Schumacher et al. | |
| 2012/0187878 A1* | 7/2012 | Fukasaku | G01R 33/1207 |
| | | | 318/400.21 |
| 2013/0174588 A1 | 7/2013 | Pham | |
| 2013/0271060 A1* | 10/2013 | Messersmith | F04B 17/00 |
| | | | 318/473 |
| 2015/0192337 A1* | 7/2015 | Choi | F25B 49/025 |
| | | | 62/230 |
| 2015/0192346 A1* | 7/2015 | Lee | F25D 21/006 |
| | | | 68/3 R |
| 2016/0245571 A1* | 8/2016 | Shinomoto | H02M 1/36 |
| 2016/0282005 A1* | 9/2016 | Kim | F04D 29/325 |
| 2016/0380575 A1* | 12/2016 | Tsumura | F25B 49/022 |
| | | | 318/478 |
| 2017/0063275 A1* | 3/2017 | Park | H02P 29/62 |
| 2017/0282714 A1* | 10/2017 | Schumacher | B60H 1/00428 |
| 2017/0288567 A1* | 10/2017 | Taguchi | F04B 49/20 |
| 2018/0187681 A1* | 7/2018 | Sakai | H02P 6/20 |
| 2018/0370383 A1* | 12/2018 | Schumacher | B60L 3/0092 |
| 2019/0234663 A1* | 8/2019 | Uhlendorf | H02P 1/44 |
| 2020/0353797 A1* | 11/2020 | Zarrabi | B60H 1/3232 |
| 2021/0108844 A1* | 4/2021 | Ryu | H02P 27/06 |
| 2021/0254841 A1* | 8/2021 | Takayama | H02P 21/26 |
| 2021/0260954 A1* | 8/2021 | Saroka | B60H 1/00014 |
| 2021/0260964 A1* | 8/2021 | Saroka | B60H 1/3226 |
| 2021/0268926 A1* | 9/2021 | Liao | B60L 53/60 |
| 2022/0090924 A1* | 3/2022 | Schumacher | G07C 5/0825 |
| 2022/0209701 A1* | 6/2022 | Kubota | F25B 49/022 |

FOREIGN PATENT DOCUMENTS

| | | |
|---|---|---|
| EP | 3440417 | 7/2021 |
| WO | 2017/176682 | 10/2017 |

\* cited by examiner

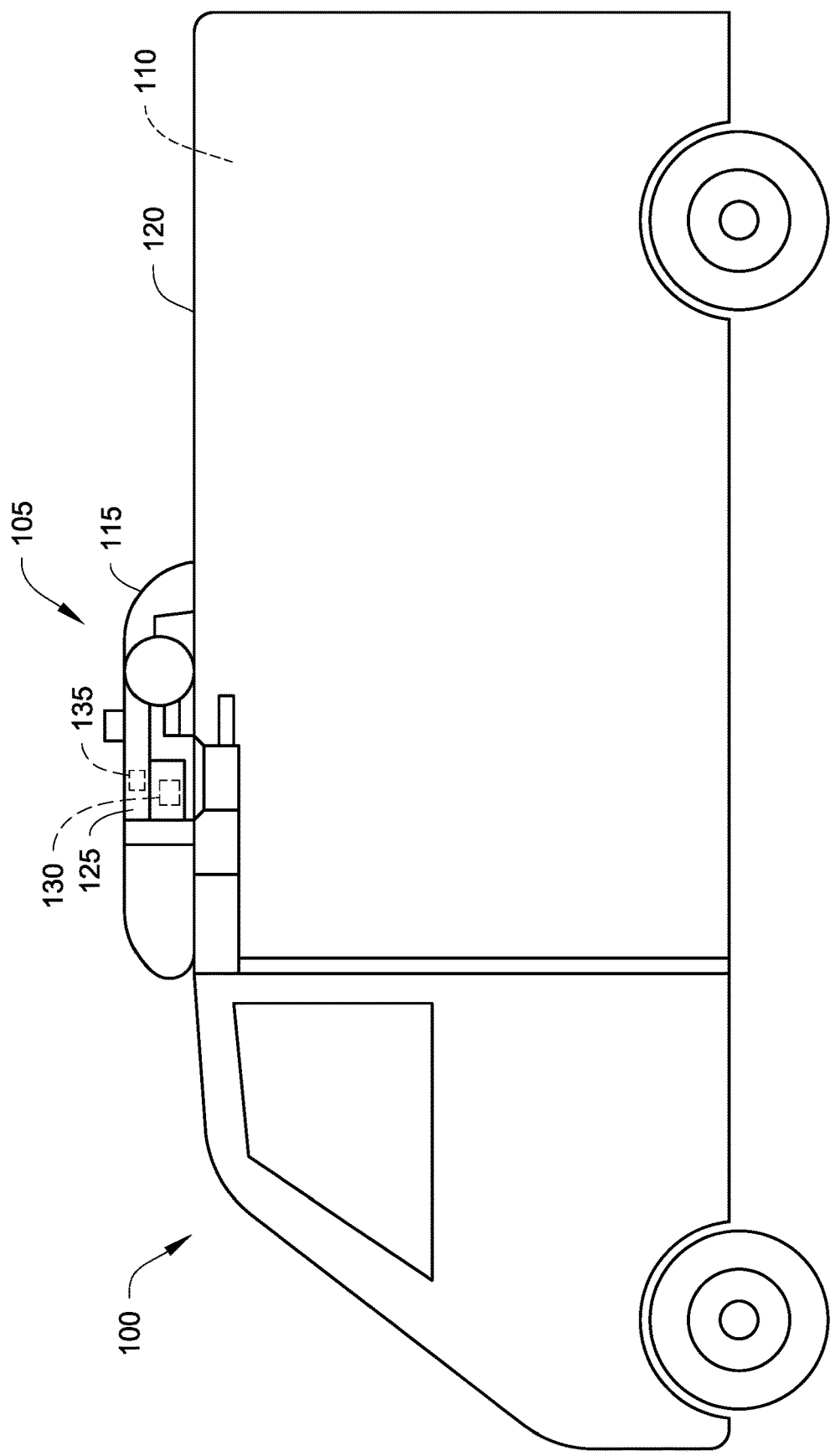

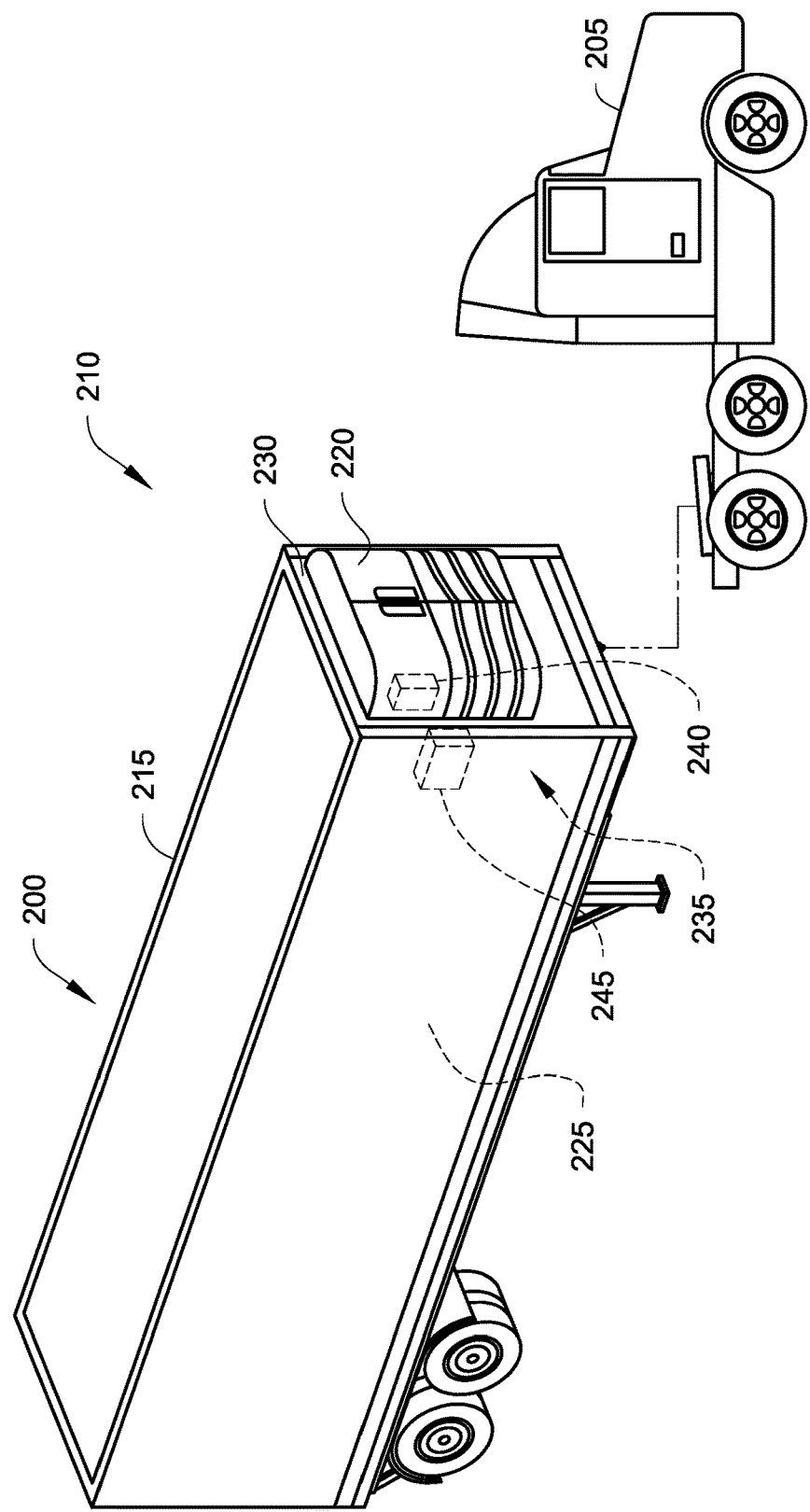

CLOSED LOOP FEEDBACK CONTROL AND DIAGNOSTICS OF A TRANSPORT CLIMATE CONTROL SYSTEM

FIELD

This disclosure relates generally to a transport climate control system. More specifically, this disclosure relates to systems and methods for closed loop feedback control and diagnostics of a transport climate control system.

BACKGROUND

A transport climate control system is generally used to control one or more environmental condition(s) (e.g., temperature, humidity, air quality, and the like) within a climate-controlled space of a transport unit (e.g., a truck, a container (such as a container on a flat car, an intermodal container, etc.), a box car, a semi-tractor, a bus, or other similar transport unit). The transport climate-controlled system may include, for example, a transport refrigeration system (TRS) and/or a heating, ventilation and air conditioning (HVAC) system. The TRS may control environmental condition(s) within the climate-controlled space to maintain cargo (e.g., produce, frozen foods, pharmaceuticals, etc.). The HVAC system may control environmental conditions(s) within the climate-controlled space to provide passenger comfort for passengers travelling in the transport unit. In some transport units, the transport climate-controlled system may be installed externally (e.g., on a rooftop or under mount of the transport unit, on a front wall of the transport unit, etc.).

SUMMARY

This disclosure relates generally to a transport climate control system. More specifically, this disclosure relates to systems and methods for closed loop feedback control and diagnostics of a transport climate control system.

The embodiments described herein can integrate current sensing and load sequencing to improve control and reliability of a transport climate control system.

In particular, the embodiments described herein can provide direct closed loop feedback for controlling current provided to high voltage power component(s) of the transport climate control system (e.g., a working fluid compressor, one or more electric heat exchanger heaters, one or more fans/blowers, a reusable energy storage source (RESS) charger, etc.) and prevent current drawn from the component(s) of the transport climate control system from exceeding e.g., maximum threshold limits with smaller safety margins.

In some embodiments, the current drawn by a motor of a compressor of the transport climate control system can be monitored and used by a controller to control the transport climate control system. In particular, precise monitoring of the current drawn by the motor of the compressor (and thus the power consumed by the compressor) and current provided from an AC power source can allow the controller to control/throttle operation of the transport climate control system in order to prevent the transport climate control system from exceeding current draw/temperature limits. Also, precise monitoring of the current drawn by the motor of the compressor and current provided from an AC power source can be used by the controller to diagnose abnormal operation by sequencing current from the AC power source to one or more components (also referred to herein as loads) of the transport climate control system and comparing current readings with maximum limit threshold values. Accordingly, the controller can operate the transport climate control system based on the monitored current to optimize efficiency, reliability and predictability of the transport climate control system.

In some embodiments, precise monitoring of the current drawn by the motor of the compressor and current provided from an AC power source can limit a technician's exposure to high voltage electrical system(s) powering the transport climate control system.

An advantage of precise monitoring of the current drawn by the motor of the compressor as opposed to e.g., using suction and/or discharge pressure sensor readings to monitor compressor power consumption is that an algorithm based on experimental/simulation testing data of the transport climate control system at various operating conditions is not required. Accordingly, experimental/simulation testing data and/or the power consumption algorithm does not need to be updated if the transport climate control system undergoes modifications (e.g., an economizer is added to the climate control circuit). That is, the embodiments described herein can promote a modular, reusable approach as current readings can remain valid regardless of changes to the transport climate control system.

Also, the use of current sensors to monitor current drawn by the motor of the compressor in combination with current sensors to monitor current provided from an AC power source can enable fast detection of abnormal conditions, enable fast response to abnormal conditions, and enable self-recovery methodologies. Accordingly, tripping of traditional protections (e.g., fuses, overload protectors, etc.) that can require manual interaction to reset and resume normal operation can be avoided.

Further, the use of current sensors to monitor current drawn by the motor of the compressor in combination with current sensors to monitor current provided from an AC power source can aid in diagnostic testing and in particular assist in identifying the root cause of failures of the electrical architecture powering the transport climate control system.

Moreover, the embodiments described herein can use current sensors to monitor current drawn by the motor of the compressor in combination with current sensors to monitor current provided from an AC power source to enable pre-start load sequencing whereby each of the high voltage transport climate control components can be started in sequence with feedback to prevent/mitigate a current transient and/or an inrush current from harming and/or permanently damaging one of the transport climate control components. The load sequencing can also be used to calculate a load factor for one or more of the high voltage transport climate control components.

In some embodiments, the current drawn by the motor of the compressor can be monitored using two current sensors that are each monitoring current of one of three phase lines. The current drawn by the motor of the compressor via the third phase line can be calculated based on the monitored current drawn via the other two phase lines. Similarly, in some embodiments, the current provided by the AC power source can be monitored using two current sensors that are each monitoring current of one of three phase lines. The current provided by the AC power source via the third phase line can be calculated based on the monitored current drawn via the other two phase lines. In some embodiments, the current sensors monitoring the current drawn by the motor of the compressor and the current sensors monitoring the current provided by the AC power source can be current transformers. Accordingly, the embodiments described herein can optimally track current drawn by multiple high voltage three-phase AC components of the transport climate control system (e.g., one or more electric heaters, one or more compressors, one or more fans/blowers, one or more RESS chargers, etc.) while using a minimum number of current sensors and thereby reducing the complexity of the electrical architecture powering the transport climate control system.

In one embodiment, a closed loop feedback control and diagnostics system for a transport climate control system that is powered by a high voltage three-phase AC power source is provided. The closed loop feedback control and diagnostics system includes a plurality of source current sensors, a plurality of compressor current sensors, and a controller. The plurality of source current sensors is configured to monitor current received from the high voltage three-phase AC power source. Each of the plurality of source current sensors is configured to monitor current directed from a single phase of the high voltage three-phase AC power source. The plurality of compressor current sensors is configured to monitor current drawn by an electrically powered compressor of the transport climate control system. Each of the plurality of compressor current sensors is configured to monitor current drawn by a single phase of the electrically powered compressor. The controller is configured to receive source current signals from each of the plurality of source current sensors, configured to receive compressor current signals from each of the plurality of compressor current sensors, and configured to control operation of the transport climate control system based on the received source current signals and the received compressor current signals.

In another embodiment, a method for operating a closed loop feedback control and diagnostics system for a transport climate control system that is powered by a high voltage three-phase AC power source is provided. The method includes a plurality of source current sensors monitoring current received from the high voltage three-phase AC power source. Each of the plurality of source current sensors monitoring current directed from a single phase of the high voltage three-phase AC power source. The method also includes a plurality of compressor current sensors monitoring current drawn by an electrically powered compressor of the transport climate control system. Each of the plurality of compressor current sensors monitoring current drawn by a single phase of the electrically powered compressor. The method further includes a controller receiving source current signals from each of the plurality of source current sensors. Moreover, the method includes the controller receiving compressor current signals from each of the plurality of compressor current sensors. Further, the method includes the controller controlling operation of the transport climate control system based on the received source current signals and the received compressor current signals.

BRIEF DESCRIPTION OF THE DRAWINGS

References are made to the accompanying drawings that form a part of this disclosure, and which illustrate embodiments in which the systems and methods described in this Specification can be practiced.

FIG. 1A illustrates a side view of a van with a transport climate control system, according to one embodiment.

FIG. 1C illustrates a perspective view of a climate controlled transport unit, according to one embodiment.

Like reference numbers represent like parts throughout.

DETAILED DESCRIPTION

This disclosure relates generally to a transport climate control system. More specifically, this disclosure relates to systems and methods for closed loop feedback control and diagnostics of a transport climate control system.

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, a rail container, etc.), a box car, a semi-tractor, a bus, or other similar transport unit.

A transport climate control system can include, for example, a climate control circuit for controlling climate control of a climate controlled space of the transport unit. The transport climate control system can include a climate control circuit that includes, without limitation, a compressor, a condenser, an expansion valve, an evaporator, an electronic throttle valve (ETV), and one or more fans or blowers to control the heat exchange between the air within the climate controlled space and the ambient air outside of the transport unit.

As referenced herein, "low voltage" may refer to Class A of the ISO 6469-3 in the automotive environment, particularly a maximum working voltage of between 0V and 60V DC or between 0V and 30V AC.

As referenced herein, "high voltage" may refer to Class B of the ISO 6469-3 in the automotive environment, particularly a maximum working voltage of between 60V and 1500V DC or between 30V and 1000V AC.

As discussed herein, a single phasing condition is a condition in which two of three phases of an AC circuit are short circuited. In the embodiments described herein, a single phasing condition can be detected when an excessive current (e.g., a current measurement that is above an expected maximum steady state current level) is detected and/or when a phase angle among a phase change from 120 degrees among phases to 180 degrees between phases is shorted.

In the embodiments described herein, a compressor overload condition can be determined by comparing a current drawn by the compressor with a predetermined expected current draw profile during normal operation (e.g., a higher starting current for a limited period of time (e.g., 250 milliseconds), followed by up to a maximum steady state current lower than a nominal current level (e.g., 26 Amps when there is a 30 Amp maximum current threshold). If the monitored current draw from the compressor exceeds a predetermined expected maximum envelope of normal operation, an overload condition can be detected.

In the embodiments described herein, an incorrect phase sequence condition can be determined based on a comparison of a monitored rising and/or falling edge current sequence to a predetermined expected rising and/or falling edge current sequence.

Figure 1B:
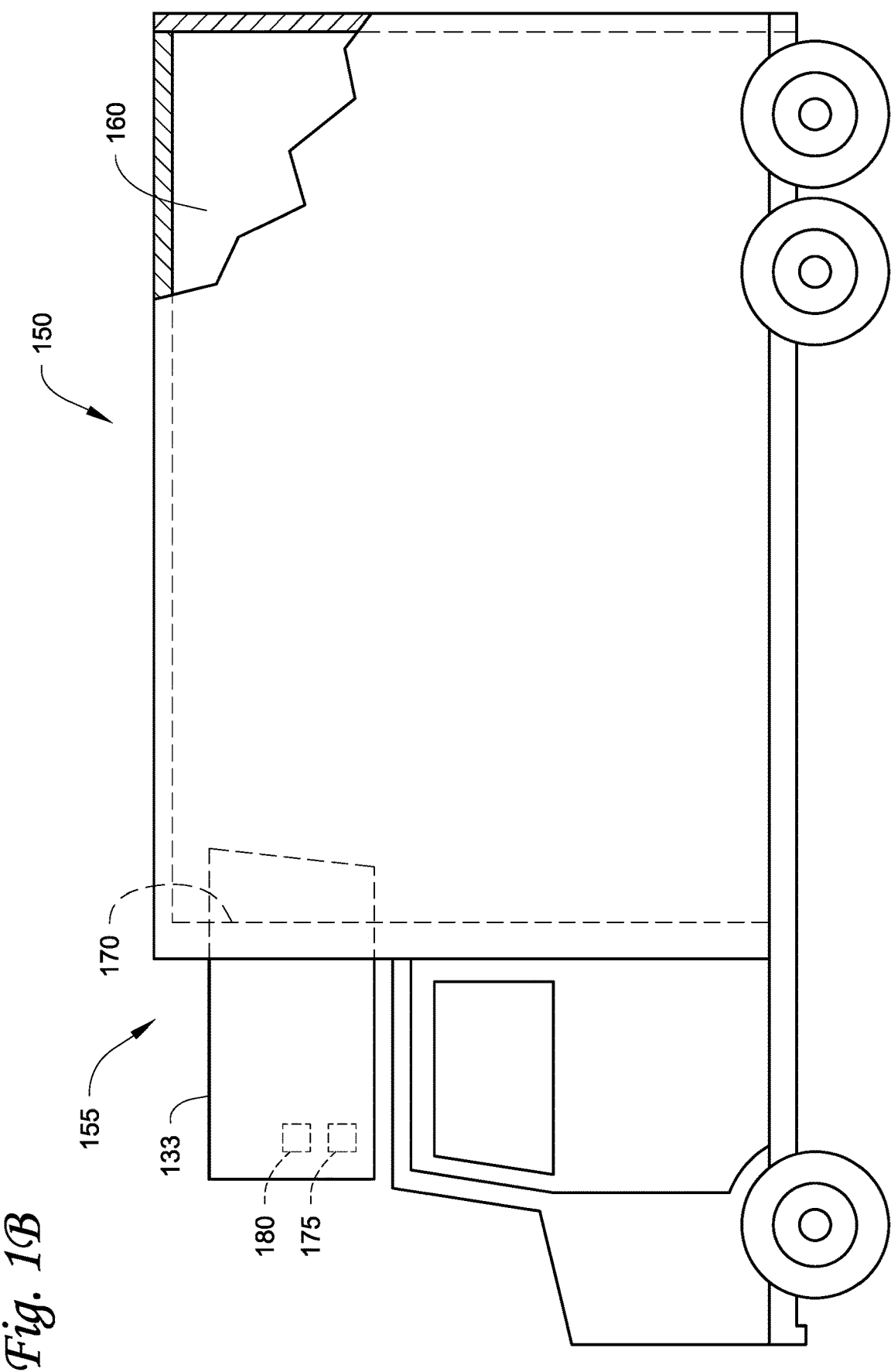
FIG. 1B illustrates a side view of a truck with a transport climate control system, according to one embodiment.
Figure 1D:
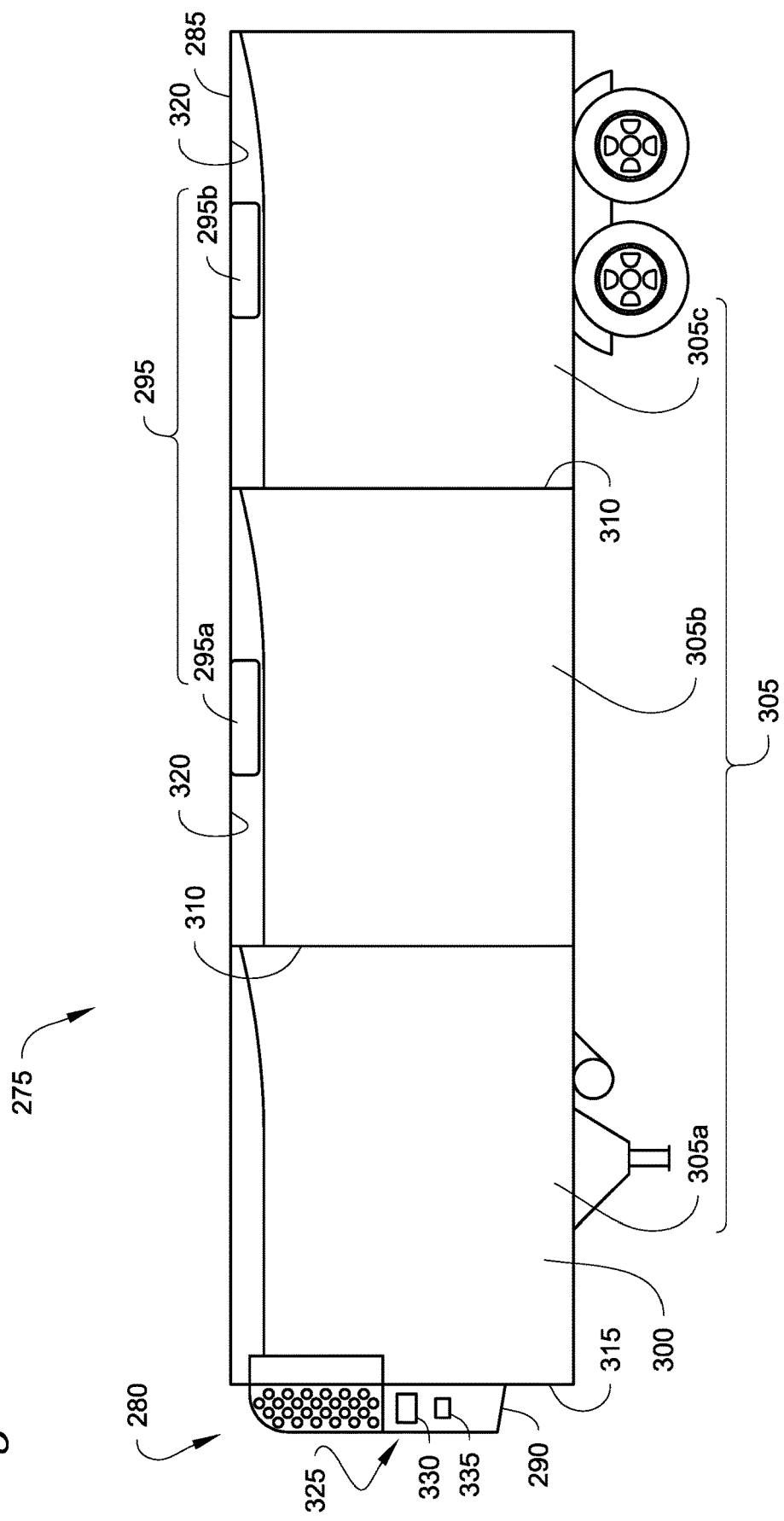
FIG. 1D illustrates a side view of a climate controlled transport unit including a multi-zone transport climate control system, according to one embodiment.
Figure 1E:
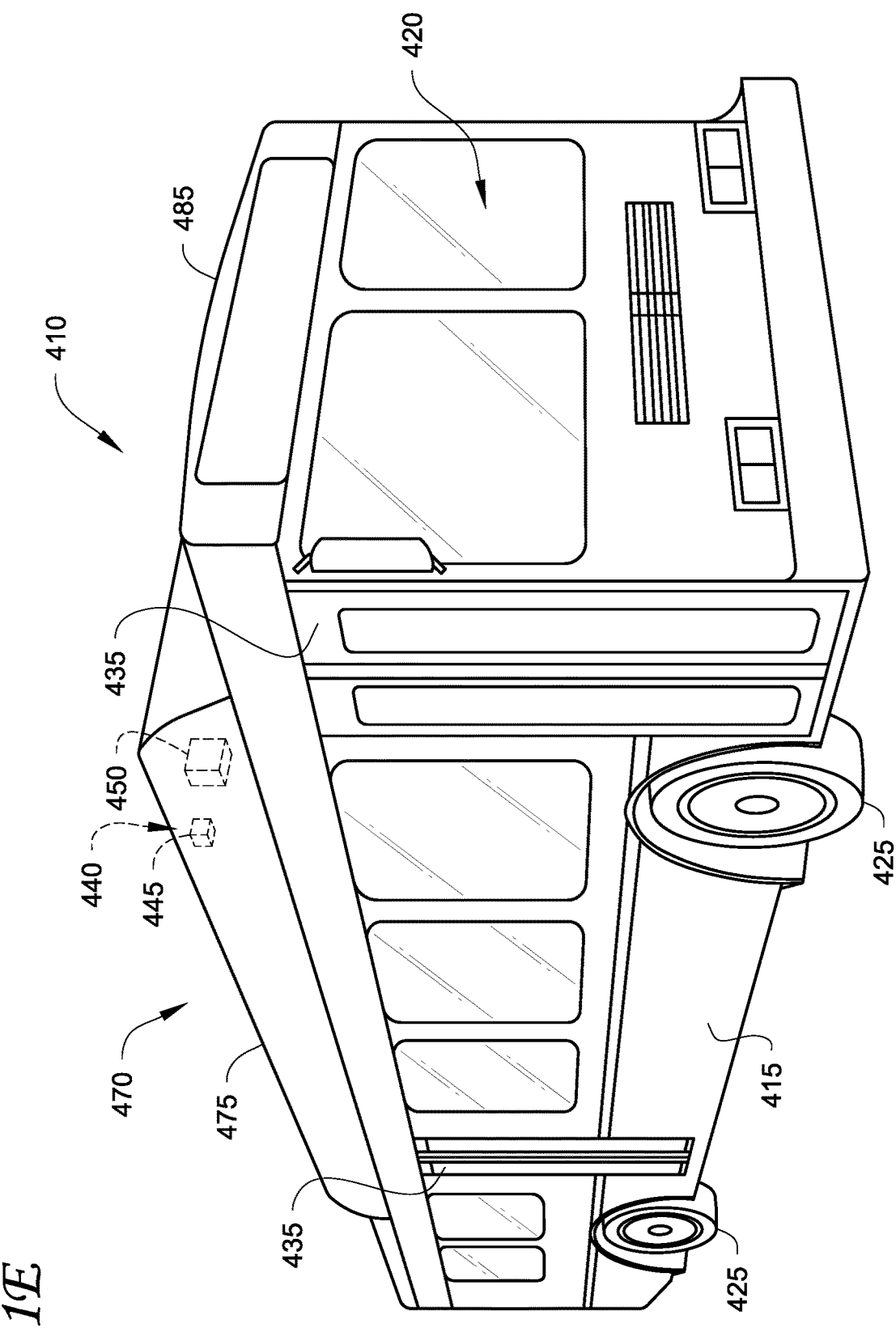
FIG. 1E illustrates a front perspective view of a public transport vehicle that includes a transport climate control system, according to one embodiment.

FIGS. 1A-1E show various transport climate control systems. FIG. 1A is a side view of a van 100 with a transport climate control system 105, according to an embodiment. FIG. 1B is a side view of a truck 150 with a transport climate control system 155, according to an embodiment. FIG. 1C is a perspective view of a climate controlled transport unit 200 attachable to a tractor 205, according to an embodiment. The climate controlled transport unit 200 includes a transport climate control system 210. FIG. 1D is a side view of a climate controlled transport unit 275 including a multi-zone transport climate control system 280, according to an embodiment. FIG. 1E is a front perspective view of a public transport vehicle 410 including a transport climate control system 470, according to one embodiment.

FIG. 1A depicts the van 100 having the transport climate control system 105 for providing climate control within a climate controlled space 110. The transport climate control system 105 includes a climate control unit (CCU) 115 that is mounted to a rooftop 120 of the van 100. In an embodiment, the CCU 115 can be a transport refrigeration unit.

The transport climate control system 105 can include, among other components, a climate control circuit (see, e.g., FIG. 2) that connects, for example, a compressor, a condenser, an evaporator, and an expansion device (e.g., an expansion valve) to provide climate control within the climate controlled space 110. It will be appreciated that the embodiments described are not limited to vans or climate-controlled vans, but can apply to any type of transport unit (e.g., a truck, a container (such as a container on a flat car, an intermodal container, a marine container, a rail container, etc.), a box car, a semi-tractor, a bus, or other similar transport unit), within the scope of the principles of this disclosure.

The transport climate control system 105 also includes a programmable climate controller 125 and one or more climate control sensors (not shown) that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors can be positioned at various locations outside the van 100 and/or inside the van 100 (including within the climate controlled space 110).

The climate controller 125 is configured to control operation of the transport climate control system 105 including the components of the climate control circuit. The climate controller 115 may include a single integrated control unit 130 or may include a distributed network of climate controller elements 130, 135. The number of distributed control elements in a given network can depend upon the particular application of the principles of this disclosure. The measured parameters obtained by the one or more climate control sensors can be used by the climate controller 125 to control operation of the climate control system 105. In some embodiments, the climate controller 125 can include a high power module, a low power module, a main application controller, a human machine interface, a telematics unit, etc.

FIG. 1B depicts the climate-controlled straight truck 150 that includes the climate controlled space 160 for carrying cargo and the transport climate control system 155. The transport climate control system 155 includes a CCU 165 that is mounted to a front wall 170 of the climate controlled space 160. The CCU 165 can include, among other components, a climate control circuit (see, e.g., FIG. 2) that connects, for example, a compressor, a condenser, an evaporator, and an expansion device to provide climate control within the climate controlled space 160. In an embodiment, the CCU 165 can be a transport refrigeration unit.

The transport climate control system 155 also includes a programmable climate controller 175 and one or more climate control sensors (not shown) that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 165 into the climate controlled space 160, a return air temperature of air returned from the climate controlled space 160 back to the CCU 165, a humidity within the climate controlled space 160, etc.) and communicate climate control data to the climate controller 175. The one or more climate control sensors can be positioned at various locations outside the truck 150 and/or inside the truck 150 (including within the climate controlled space 160).

The climate controller 175 is configured to control operation of the transport climate control system 155 including components of the climate control circuit. The climate controller 175 may include a single integrated control unit 175 or may include a distributed network of climate controller elements 175, 180. The number of distributed control elements in a given network can depend upon the particular application of the principles described herein. The measured parameters obtained by the one or more climate control sensors can be used by the climate controller 175 to control operation of the climate control system 155.

FIG. 1C illustrates one embodiment of the climate controlled transport unit 200 attached to a tractor 205. The climate controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 210 includes a CCU 220 that provides environmental control (e.g. temperature, humidity, air quality, etc.) within a climate controlled space 225 of the transport unit 215. The CCU 220 is disposed on a front wall 230 of the transport unit 215. In other embodiments, it will be appreciated that the CCU 220 can be disposed, for example, on a rooftop or another wall of the transport unit 215. The CCU 220 includes a climate control circuit (see e.g., FIG. 2) that connects, for example, a compressor, a condenser, an evaporator, and an expansion device to provide conditioned air within the climate controlled space 225. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors can be positioned at various locations outside the transport unit 200 and/or inside the transport unit 200 (including within the climate controlled space 225).

The climate controller 235 is configured to control operation of the transport climate control system 210 including components of the climate control circuit. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the climate control system 210.

FIG. 1D illustrates an embodiment of the climate controlled transport unit 275. The climate controlled transport unit 275 includes the multi-zone transport climate control system (MTCS) 280 for a transport unit 285 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, a rail container, etc.), a box car, a semi-tractor, a bus, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The climate controlled space 300 can be divided into a plurality of zones 305. The term "zone" means a part of an area of the climate controlled space 300 separated by walls 310. The CCU 290 can operate as a host unit and provide climate control within a first zone 305a of the climate controlled space 300. The remote unit 295a can provide climate control within a second zone 305b of the climate controlled space 300. The remote unit 295b can provide climate control within a third zone 305c of the climate controlled space 300. Accordingly, the MTCS 280 can be used to separately and independently control environmental condition(s) within each of the multiple zones 305 of the climate controlled space 300.

The CCU 290 is disposed on a front wall 315 of the transport unit 275. In other embodiments, it will be appreciated that the CCU 290 can be disposed, for example, on a rooftop or another wall of the transport unit 275. The CCU 290 includes a climate control circuit (see, e.g., FIG. 2) that connects, for example, a compressor, a condenser, an evaporator, and an expansion device to provide conditioned air within the climate controlled space 300. The remote unit 295a is disposed on a ceiling 320 within the second zone 305b and the remote unit 295b is disposed on the ceiling 320 within the third zone 305c. Each of the remote units 295a,b include an evaporator (not shown) that connects to the rest of the climate control circuit provided in the CCU 290. In an embodiment, the CCU 290 can be a transport refrigeration unit.

The MTCS 280 also includes a programmable climate controller 325 and one or more climate control sensors (not shown) that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate climate control data to a climate controller 325. The one or more climate control sensors can be positioned at various locations outside the transport unit 275 and/or inside the transport unit 275 (including within the climate controlled space 300).

The climate controller 325 is configured to control operation of the MTCS 280 including components of the climate control circuit. The climate controller 325 may include a single integrated control unit 330 or may include a distributed network of climate controller elements 330, 335. The number of distributed control elements in a given network can depend upon the particular application of the principles described herein. The measured parameters obtained by the one or more climate control sensors can be used by the climate controller 325 to control operation of the MTCS 280.

FIG. 1E illustrates a public transport vehicle 410 that includes a frame 415, a climate controlled passenger compartment 420 supported by the frame 415 and wheels 425. The frame 415 includes doors 435 that are positioned on a side of the public transport vehicle 410. As shown in FIG. 1E, a first door 435 is located adjacent to a forward end of the public transport vehicle 410, and a second door 435 is positioned on the frame 415 toward a rearward end of the public transport vehicle 410. Each door 435 is movable between an open position and a closed position to selectively allow access to the passenger compartment 420. The vehicle 410 also includes a transport climate control system 470 for providing climate control to the passenger compartment 420.

The transport climate control system 470 includes a CCU 475 that provides environmental control (e.g. temperature, humidity, air quality, etc.) within the climate controlled passenger compartment 420 of the public transport vehicle 410. The CCU 475 is attached to the frame 415 on a roof 485 of the public transport vehicle 410. In other embodiments, it will be appreciated that the CCU 475 can be disposed, for example, on another wall of the public transport vehicle 410. The CCU 475 includes a climate control circuit (see e.g., FIG. 2) that connects, for example, a compressor, a condenser, an evaporator, and an expansion device to provide conditioned air within the climate controlled passenger compartment 420.

The transport climate control system 470 also includes a programmable climate controller 440 and one or more climate control sensors (not shown) that are configured to measure one or more parameters of the transport climate control system 470 (e.g., an ambient temperature outside of the public transport vehicle 410, an ambient humidity outside of the public transport vehicle 410, a compressor suction pressure, a compressor discharge pressure, a supply air temperature of air supplied by the CCU 475 into the climate controlled passenger compartment 420, a return air temperature of air returned from the climate controlled passenger compartment 420 back to the CCU 475, a humidity within the climate controlled passenger compartment 420, etc.) and communicate the measured parameters to the climate controller 440. The one or more climate control sensors can be positioned at various locations outside the public transport vehicle 410 and/or inside the public transport vehicle 410 (including within the climate controlled passenger compartment 420).

The climate controller 440 is configured to control operation of the transport climate control system 470 including the components of the climate control circuit. The climate controller 440 may include a single integrated control unit 445 or may include a distributed network of climate controller elements 445, 450. The number of distributed control elements in a given network can depend upon the particular application of the principles of this disclosure.

The measured parameters obtained by the one or more climate control sensors can be used by the climate controller 440 to control operation of the transport climate control system 470. In some embodiments, the climate controller 440 can include a high power module, a low power module, a main application controller, a human machine interface, a telematics unit, etc.

In an embodiment, a CCU (e.g., the CCUs 115, 165, 220, 290, 475 in FIGS. 1A-1E) can be an electrically powered climate control unit or a hybrid powered climate control unit that can be powered by an electric power source and/or a mechanical power source. Also, in an embodiment, the CCU can include a rechargeable energy storage device (not shown) that can provide power to a transport climate control system (e.g., the transport climate control systems in FIGS. 1A-1E). In an embodiment, the rechargeable energy storage device can be charged by AC power (e.g., three-phase AC power, single phase AC power, etc.). In an embodiment, the rechargeable energy storage device can be charged by DC power.

Figure 2:
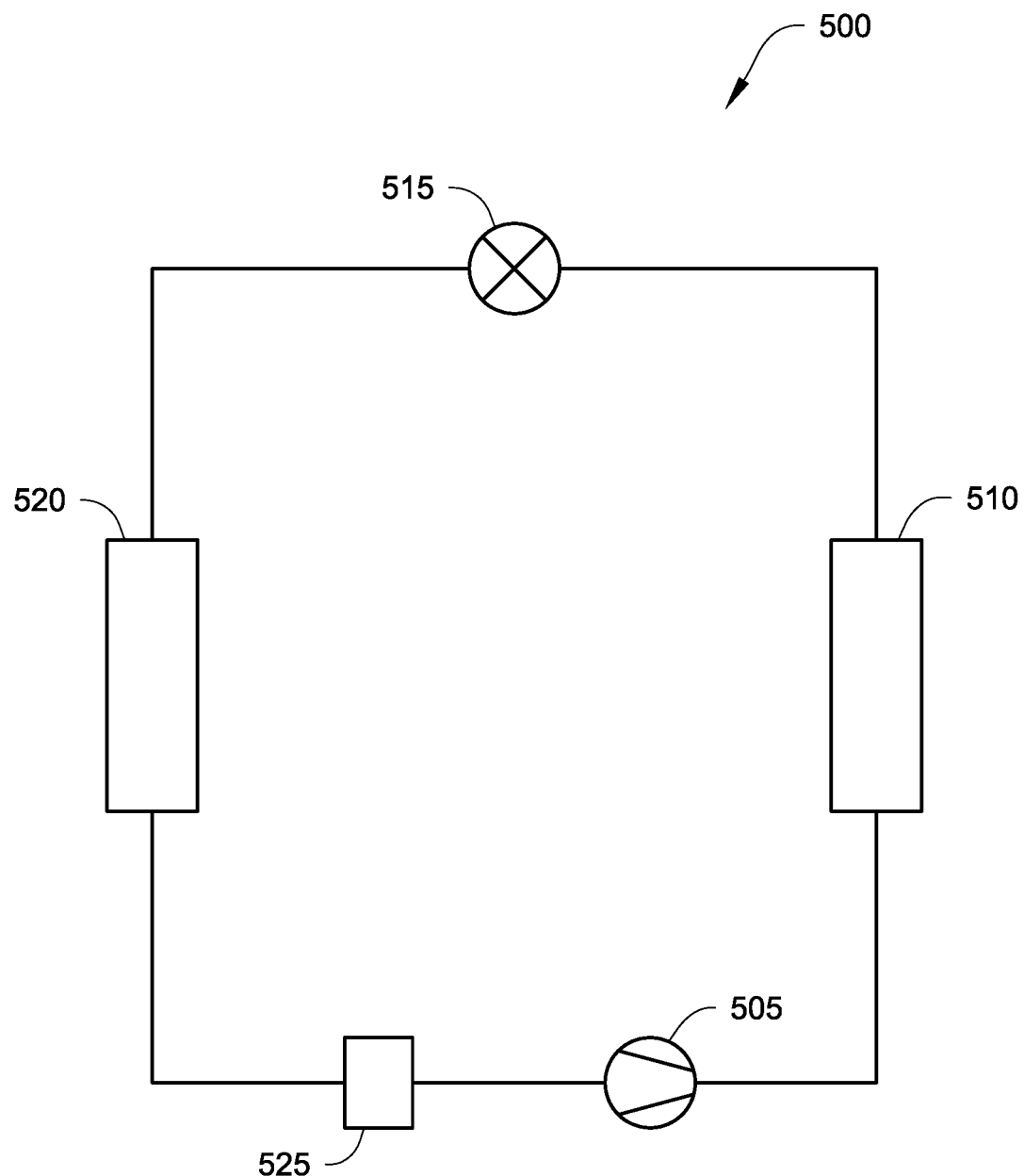
FIG. 2 illustrates a schematic diagram of a climate control circuit, according to one embodiment.

FIG. 2 is a schematic diagram of a climate control circuit 500, according to one embodiment. The climate control circuit 500 generally includes a working fluid compressor 505, a condenser 410, an expansion device 515, an evaporator 520, and an electronic throttle valve (ETV) 525. The compressor 505 can be, for example, a scroll compressor, a reciprocal compressor, or the like. In the embodiments described herein, the compressor 505 is an electrically driven compressor. In some embodiments, the compressor 505 can be a hermetic compressor. It will be appreciated that the torque load of a motor of the compressor 505, and therefore the current drawn by the compressor 505, can vary depending on the amount of working fluid directed to the compressor. In some embodiments, the compressor 505 can require the most power of any of the transport climate control components and as discussed above can have a variable power consumption.

The climate control circuit 500 is exemplary and can be modified to include additional components. For example, in some embodiments the climate control circuit 500 can include an economizer heat exchanger, one or more flow control devices (e.g., valves or the like), a receiver tank, a dryer, a suction-liquid heat exchanger, or the like.

The climate control circuit 500 can generally be applied in a variety of systems used to control an environmental condition (e.g., temperature, humidity, air quality, or the like) in a space (generally referred to as a climate controlled space). Examples of systems include, but are not limited to the climate control systems shown and described above in accordance with FIGS. 1A-1E.

The components of the climate control circuit 500 are fluidly connected. The climate control circuit 500 can be specifically configured to operate in a cooling mode to provide cold air to a climate controlled space, a heating/defrost mode to provide warm air to the climate controlled space and/or defrost coils of the evaporator 520.

Climate control circuit 500 operates according to generally known principles. The climate control circuit 500 can be configured to heat or cool a working fluid or medium (e.g., a gas such as, but not limited to, air or the like).

In operation, the compressor 505 compresses a working transfer fluid (e.g., refrigerant or the like) from a relatively lower pressure gas to a relatively higher-pressure gas. The relatively higher pressure and higher temperature gas is discharged from the compressor 505 via a compressor discharge port and flows through the condenser 510. In accordance with generally known principles, the working fluid flows through the condenser 510 and rejects heat to a heat transfer fluid or medium (e.g., air, etc.), thereby cooling the working fluid. The cooled working fluid, which is now in a liquid form, flows to the expansion device 515 (e.g., an expansion valve or the like). The expansion device 515 reduces the pressure of the working fluid. As a result, a portion of the working fluid is converted to a gaseous form. The working fluid, which is now in a mixed liquid and gaseous form flows to the evaporator 520. The working fluid flows through the evaporator 520 and absorbs heat from a heat transfer medium (e.g., air, etc.), heating the working fluid, and converting it to a gaseous form. Downstream of the evaporator 520, the ETV 525 controls the flow of gaseous working fluid to a suction port of the compressor 505. The gaseous working fluid passing through the ETV 525 then returns to the compressor 505 via the suction port. In some embodiments, the ETV 525 can have a variable size opening that regulates the amount of working fluid allowed to pass there through. That is, the ETV 525 can have a fully open position, a fully closed position, and multiple partially opened positions of varying sizes between the fully open position and the fully closed position. For example, in some embodiments, the ETV 525 can provide 800 different size openings between the fully open position and the fully closed position. The above-described process continues while the climate control circuit is operating, for example, in a cooling mode (e.g., while the compressor 505 is enabled).

The ETV 525 and the compressor 505 can be controlled, for example, via a climate controller (e.g., the climate controller 125, 175, 235, 325 and 440 shown in FIGS. 1A-E). In particular, the climate controller can control the opening of the ETV 525 to control the amount of gaseous working fluid passing through the ETV 525 to the suction port of the compressor 505. This can control the amount of current drawn by the compressor 505 to compress the working fluid. By controlling the amount of current drawn by the compressor 505, the climate controller can prevent the compressor 505 from drawing current that exceeds a maximum current threshold of a high voltage three-phase AC power source powering the compressor 505 and thereby, for example, overloading the high voltage three-phase AC power source.

Figure 3:
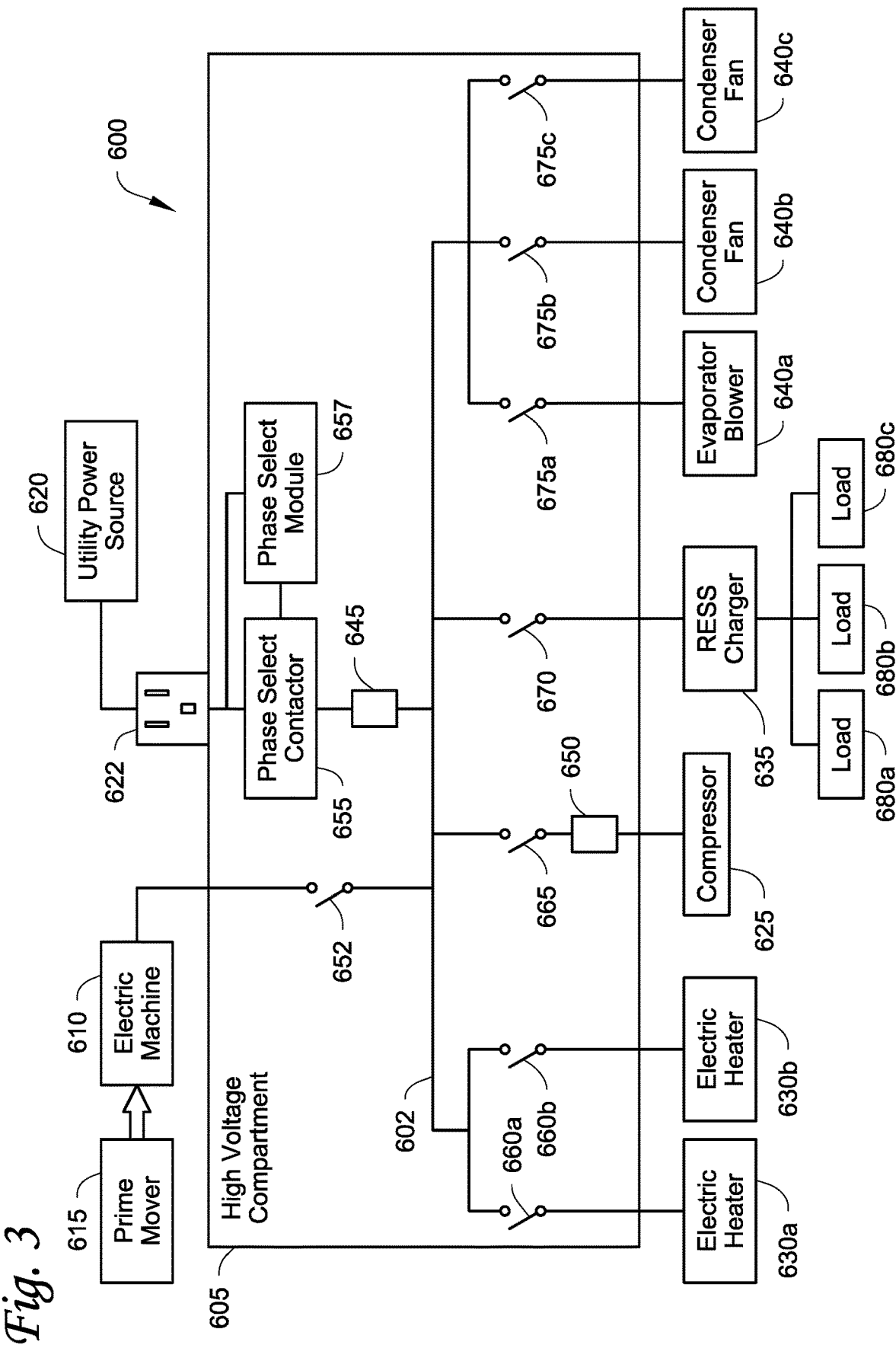
FIG. 3 illustrates an electrical architecture for powering high voltage components of a transport climate control system, according to one embodiment.

FIG. 3 illustrates an electrical architecture 600 for powering high voltage components of a transport climate control system (e.g., the transport climate control systems 105, 155, 210, 280 and 470 shown in FIGS. 1A-E). In the embodiments described herein, the electrical architecture 600 is a high voltage three-phase AC power architecture. It will also be appreciated that the electrical architecture 600 includes a high voltage three-phase AC power network 602 that does not include a neutral return connection. The high voltage three-phase AC power network 602 is provided within a high voltage compartment 605.

The electrical architecture 600, and particularly the high voltage three-phase AC power network 602 is configured to receive high voltage power and distribute the high voltage power to high voltage components of the transport climate control system. In some embodiments, the high voltage three-phase AC power network 602 is configured to receive high voltage three-phase AC power.

In some embodiments, the high voltage three-phase AC power network 602 can receive high voltage three-phase AC power from multiple power sources including, for example, an electric machine (e.g., motor generator) 610 driven by a prime mover (e.g., engine) 615. Also, in some embodiments, the high voltage three-phase AC power network 602 can receive high voltage three-phase AC power from a utility power source 620 via, for example, an electric plug 622. In some embodiments, the high voltage compartment 605 can be configured to receive 480 volts AC power (VAC) at 60 Hz from the utility power source 620. Also, it will be appreciated that the high voltage three-phase AC power network 602 can be configured to receive a variable voltage and frequency from the electric machine 610 depending on whether the prime mover 615 is operating at a lowest speed, a highest speed, or a variable speed inbetween. It will be appreciated that in some embodiments the prime mover 615 can be a continuously variable speed prime mover capable of operating at multiple speeds. In other embodiments, the prime mover 615 can be a two speed prime mover capable of operating at a low speed and at a high speed. It will be appreciated that in some embodiments, the maximum current that can be provided by the utility power source 620 and the electric machine 610 is 30 amps.

The high voltage three-phase AC power network 602 is configured to distribute high voltage three-phase AC power to various high voltage components of the transport climate control system. The high voltage components includes a compressor 625, two electric heat exchanger heaters 630a,b, a RESS charger 635, three fans/blowers 640a-c. It will be appreciated that the high voltage components shown in FIG. 3 is according to only one embodiment and in other embodiments, there may be other combinations of high voltage components including, for example, a different number of electric heat exchanger heaters, fans/blowers, compressors, RESS chargers, etc. It will be appreciated that the high voltage three-phase AC power network 602 can provide high voltage three-phase AC power to other components of the transport climate control system not described herein.

The compressor 625 is configured to compress working fluid passing through a climate control circuit (e.g., the climate control circuit 500 shown in FIG. 2). In the embodiments described herein, the compressor 625 is an electrically driven compressor. In some embodiments, the compressor 625 can be a hermetic compressor. The electric heat exchanger heaters 630a,b are configured to heat one or more evaporator coils of an evaporator (e.g., the evaporator 520 shown in FIG. 2). The RESS charger 635 is configured to charge a RESS and to supply low voltage power to various low voltage loads 680 of the transport climate control system (e.g., a climate controller, an engine control unit, solenoid valve(s), sensor(s), etc.). In some embodiments, the RESS charger 635 can be a battery charger and the RESS can be a battery source that includes one or more rechargeable batteries. In some embodiments, the RESS charger 635 can include one or more DC/DC converters. The fans/blowers 640a-c can include one or more evaporator blowers configured to direct air across an evaporator coil(s) of an evaporator towards a climate controlled space and one or more condenser fans configured to direct air passing over a condenser coil(s) out of a CCU and into the ambient outside of the CCU.

The high voltage three-phase AC power network 602 includes an electric machine contactor 652, a phase select contactor 655 operating with a phase select module 657, a plurality of heater contactors 660, a compressor contactor 665, a RESS charger 670, and a plurality of fan/blower contactors 675. The phase select contactor 655 is an electrically controlled switch that is configured to direct three-phase AC power from the utility power source 620 via the electric plug 622 to the high voltage components of the transport climate control system (e.g., the compressor 625, the electric heat exchanger heaters 630a,b, the RESS charger 635, the fans/blowers 640a-c). The electric machine contactor 652 is an electrically controlled switch that is configured to be in a closed state or an open state depending on whether power is to be supplied to the electrical architecture 600 via the electric machine 610 or via the utility power source 620. The phase select contactor 655 can be put into an open state, for example, to protect the electrical architecture 600 from a voltage overload from the utility power source 620. The phase select contactor 655 and the phase select module 657 are also configured to ensure proper connection of the compressor 625 and/or the fans/blowers 640a-c when power is being provided to the compressor 625 and/or the fans/blowers 640a-c via the utility power source 620. In particular, the phase select module 657 monitors and identifies a phase sequence of the high voltage three-phase AC power received from the utility power source 620 and rearranges the three phases of the high voltage three-phase AC power via the phase select contactor 655 to force a desired rotation direction of the compressor 625 and/or the fans/blowers 640a-c. This can help prevent reverse rotation of the compressor 625 and/or the fans/blowers 640a-c which can cause damage to the compressor 625 and/or the fans/blowers 640a-c. Each of the two heater contactors 660a,b is an electrically controlled switch that is configured to be in a closed state or an open state depending on whether the particular electric heat exchanger heater 630a,b is to be provided high voltage AC power. The compressor contactor 665 is an electrically controlled switch that is configured to be in a closed state or an open state depending on whether the compressor 625 is to be provided high voltage AC power. The RESS charger contactor 670 is an electrically controlled switch that is configured to be in a closed state or an open state depending on whether the RESS charger 635 is to be provided high voltage AC power. Each of the fan/blower contactors 675 is an electrically controlled switch that is configured to be in a closed state or an open state depending on whether the particular evaporator blower 640a or the condenser fans 640b,c is to be provided high voltage AC power. It will be appreciated that the high voltage compartment 605 can be one or more physical compartments within the transport climate control system and that the contactors 655, 660, 665, 670 and 675 and the phase select module 657 can all be located within different physical compartments of the high voltage compartment 605 while still part of the high voltage three-phase AC power network 602.

It will also be appreciated that the components discussed within the high voltage compartment 605 and along the high voltage three-phase AC power network 602 is non-limiting. That is, the high voltage compartment 605 and the high voltage three-phase AC power network 602 can include other components not shown in FIG. 3. For example, the high voltage three-phase AC power network 602 can include, for example, protection components (e.g., fuses, overload protectors, etc.) that can be used to limit excessive current due to an electric short between high voltage phases. It will be appreciated that a separate protection component can be provided for each of the high voltage AC components (e.g., the electric heaters 630a,b, the compressor 625, the RESS charger 635, the fans/blowers 640, etc.). In some embodiments, one or more of the protection components can require a manual interaction to reset and resume normal operation of the electrical architecture 600.

The electrical architecture 600 can be controlled by a controller (not shown). In some embodiments, the controller can be the climate controller (e.g., the climate controllers 125, 175, 235, 325, 440 shown in FIGS. 1A-E) that controls operation of the transport climate control system. In particular, the controller can control operation of the phase select contactor 655, the plurality of heater contactors 660, and the compressor contactor 665. That is, the controller can independently instruct each of the phase select contactor 655, the plurality of heater contactors 660, and the compressor contactor 665 whether to be in a closed state to allow high voltage AC power to be directed to any of the electric heat exchanger heaters 630a,b, and the compressor 625 or to be in an open state to prevent high voltage AC power from being directed to any of the electric heat exchanger heaters 630a,b and the compressor 625.

The electrical architecture 600 also includes a plurality of source current sensors 645 and a plurality of compressor current sensors 650. The plurality of source current sensors 645 are configured to monitor current received by the high voltage compartment 605. In some embodiments, the electrical architecture 600 can include two source current sensors 645 each of which monitoring two separate phases of the high voltage three-phase AC power received by the high voltage compartment 605. In these embodiments, the controller can calculate the current of the third phase. In some embodiments, the electrical architecture 600 can include three source current sensors 645 each of which monitoring all three phases of the high voltage three-phase AC power received by the high voltage compartment 605. In some embodiments, the source current sensors 645 and the compressor current sensors 650 can be current transformers.

In some embodiments, the electrical architecture 600 can include two compressor current sensors 650 each of which monitoring two separate phases of the high voltage three-phase AC power drawn by the compressor 625. In some embodiments, the electrical architecture 600 can include three compressor current sensors 650 each of which monitoring all three phases of the high voltage three-phase AC power drawn by the compressor 625.

The electrical architecture 600 can be operated as a closed loop control and diagnostic system for powering the transport climate control system. Details of a closed loop control and diagnostic system according to one embodiment is discussed below with respect to FIG. 4.

Figure 4:
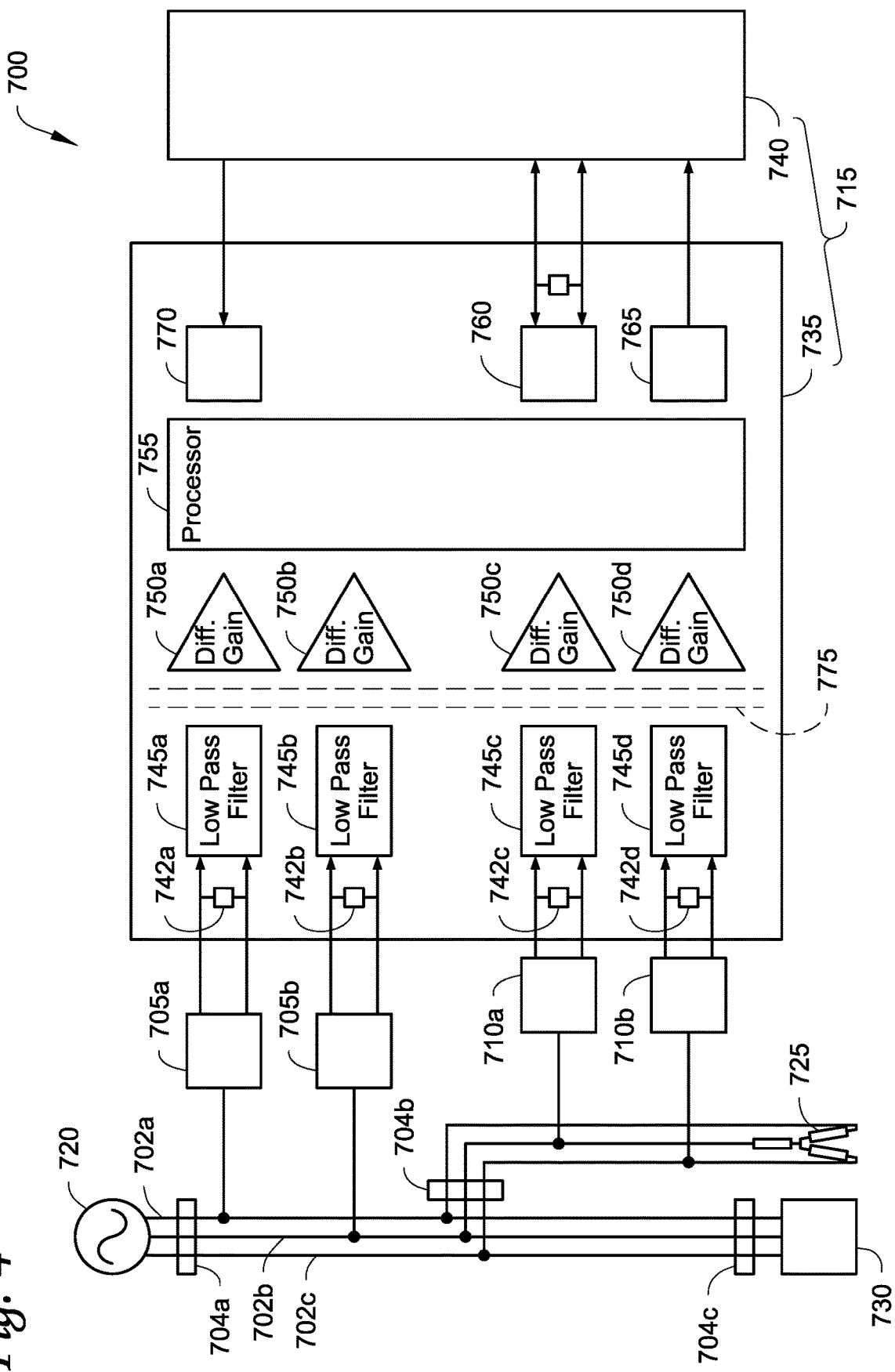
FIG. 4 illustrates a schematic of a closed loop feedback control and diagnostic system for powering a transport climate control system, according to one embodiment.

FIG. 4 illustrates a schematic of a closed loop control and diagnostic system 700 for powering a transport climate control system, according to one embodiment. The system 700 can be part of and used in conjunction with a high voltage three-phase AC electrical architecture (e.g., the electrical architecture 600 shown in FIG. 3). The system 700 includes a plurality of contactors 704a-c, a plurality of source current sensors 705a,b, a plurality of compressor current sensors 710a,b, and a controller 715. The source current sensors 705a,b can be, for example, the source current sensors 645 shown in FIG. 3. The compressor current sensors 710a,b can be, for example, the compressor current sensors 650 shown in FIG. 3. In some embodiments, the compressor current sensors 710a,b can be placed between a compressor harness interface and a compressor motor.

The system 700 receives power from a high voltage three-phase AC power source 720 via three-phase lines 702a-c that does not include neutral return. The three-phase lines 702a-c can be part of, for example, a high voltage three-phase AC power network (e.g. the high voltage three-phase AC power network 602 shown in FIG. 3). The high voltage three-phase AC power source 720 can be one or more of, for example, a utility power source (e.g., the utility power source 620 shown in FIG. 3), a prime mover and electric machine combination (e.g., the prime mover 615 and the electric machine 610 shown in FIG. 3), etc. Similar to as shown in FIG. 3, the high voltage three-phase AC power source 720 can provide high voltage three-phase AC power to a compressor 725 and to another high voltage transport climate control component 730 (e.g., an electric heat exchanger heater, a RESS charger, a fans/blower, etc.). It will be appreciated that in some embodiments, the system 700 can include multiple high voltage transport climate control components 730 (e.g., one or more electric heat exchanger heaters, a RESS charger, one or more fans/blowers, etc.). It will be appreciated that in some embodiments, the system 700 can receive power from multiple high voltage three-phase AC power sources such as a prime mover driven electric machine (e.g., the electric machine 610 shown in FIG. 3), a utility power source (e.g., the utility power source 620 shown in FIG. 3), etc.

The plurality of contactors 704a-c includes a high voltage power source contactor 704a, a compressor contactor 704b, and a component contactor 704c. When the high voltage three-phase AC power source 720 is a utility power source (e.g. the utility power source 620 shown in FIG. 3), the high voltage power source contactor 704a can operate as discussed above with respect to the phase select contactor 655 shown in FIG. 3. When the high voltage three-phase AC power source 720 is an electric machine powered by a prime mover (e.g. the electric machine 610 shown in FIG. 3), the high voltage power source contactor 704a can operate as discussed above with respect to the electric machine contactor 652 shown in FIG. 3. The high voltage power source contactor 704a is an electrically controlled switch that is configured to direct three-phase AC power from the high voltage three-phase AC power source 720 to the high voltage three-phase AC components of the transport climate control system (e.g., the compressor 725, the high voltage transport climate control components 730). The high voltage power source contactor 704a can be put into an open state, for example, to protect the system 700 from a voltage overload from the high voltage three-phase AC power source 720. The compressor contactor 704b operates as discussed above with respect to the compressor contactor 665 shown in FIG. 3. The compressor contactor 704b is an electrically controlled switch that is configured to be in a closed state or an open state depending on whether the compressor 725 is to be provided high voltage AC power. The component contactor 704c is an electrically controlled switch that is configured to be in a closed state or an open state depending on whether the high voltage transport climate control component 730 is to be provided high voltage AC power. It will be appreciated that in other embodiments, the system 700 includes multiple high voltage transport climate control components each of which potentially having a separate contactor configured to be in a closed state or an open state depending on whether the particular high voltage transport climate control component is to be provided high voltage AC power. Each of the contactors 704a-c can be controlled to be in a closed state or an open state by the controller 715.

The source current sensor 705a is configured to monitor current received, via a first phase line 702a, from a high voltage three-phase AC power source 720. The source current sensor 705b is configured to monitor current received, via a second phase line 702b, from the high voltage three-phase AC power source 720. The compressor current sensor 710a is configured to monitor current drawn, from a third phase line 702c, by the compressor 725. The compressor current sensor 710b is configured to monitor current drawn, from the second phase line 702b, by the compressor 725. Accordingly, in this embodiment, current provided, via the first and second phases lines 702a,b, from the high voltage three-phase AC power source 720 is monitored and current drawn, via the second and third phase lines 702b,c, by the compressor 725.

Because the system 700 receives power via three-phase lines 702a-c without a neutral return connection, the controller 715 can calculate current received from the high voltage three-phase AC power source 720 via the third phase line 702c based on the current received from the high voltage three-phase AC power source 720 via the first and second phase lines 702a,b. Similarly, the controller 715 can calculate current drawn by the compressor 725 via the first phase line 702a based on the current drawn by the compressor 725 via the second and third phase lines 702b,c.

In other embodiments, the system 700 can include three source current sensors 705 that monitor current received from the high voltage three-phase AC power source 720 via all the three-phase lines 702. Also, in some embodiments, the system 700 can include three compressor current sensors 710 that monitor current drawn by the compressor 725 via all the three-phase lines 702.

In some embodiments, the source current sensors 705 and the compressor current sensors 710 can be current transformers. In these embodiments, each of the source current sensors 705 and the compressor current sensors 710 can provide an isolation barrier between the high voltage AC power from the high voltage three-phase AC power source 720 and low voltage components of the transport climate control system, particularly the controller 715. Also, the source current sensors 705 and the compressor current sensors 710 can send a reduced current signal indicative of the current monitored by the current transformer. In some embodiments, the current transformers can reduce the current signal sent to the current processing portion 735 by a factor of 1000. For example, if the current monitored by one of the current transformers is 30 amps, the current signal sent to the current processing portion 735 can be 30 milliamps. In some embodiments, the current transformers can be self-powered and do not require an external power source for operation.

The controller 715 includes a current processing portion 735 and a main controller portion 740. The current processing portion 735 is configured to receive and process monitored current signals from the source current sensors 705 and the compressor current sensors 710. The main controller portion 740 receives processed current signals from the current processing portion 735 and is configured to control operation of the transport climate control system including the contactors 704a-c, the compressor 725 and the high voltage transport climate control components 730.

The current processing portion 735 includes a plurality of shunt resistors 742a-d, a plurality of low pass filters 745a-d, a plurality of differential gain amplifiers 750a-d, a processor 755, communication device 760, an interrupt device 765, and a power input 770. Each of the plurality of shunt resistors 742a-d is configured to cause a voltage drop of the monitored current signals received from the source current sensors 705 and the compressor current sensors 710.

Each of the plurality of low pass filters 745a-d is configured to filter noise from the monitored current signals to generate filtered current signals. Each of the plurality of differential gain amplifiers 750a-d is configured to convert the filtered current signals within a desired voltage range. For example, in one embodiment, the differential gain amplifiers 750a-d can convert the filtered current signal within a 0 to 5 DC voltage range. The filtered current signals are then sent to the processor 755.

The processor 755 is configured to receive the filtered current signals and run the filtered current signals through one or more digital filters. The processor 755 is also configured to calculate a frequency and a true root mean square (RMS) current value of the filtered current signals. The processor 755 can also, for example, monitor for current imbalance between the three phases, calculate a phasor difference between the current signals received from the source current sensors 705 and the compressor current sensors 710 in order to determine the amount of current flowing to the transport climate control component 730, calculate a power factor of reactive loads based on a phase difference between resistive loads (e.g., one or more electric heaters) and the current transport climate control component 730 being tested using phase sequencing, etc.

In some embodiments, the processor 755 can also calculate current received from the high voltage three-phase AC power source 720 via the third phase line 702c based on the current received from the high voltage three-phase AC power source 720 via the first and second phase lines 702a,b. Similarly, the processor 755 can calculate current drawn by the compressor 725 via the first phase line 702a based on the current drawn by the compressor 725 via the second and third phase lines 702b,c.

The processor 755 is also configured to check whether the filtered current signals are within predefined acceptable current ranges. If the processor 755 determines that all of filtered current signals are within the predefined acceptable ranges, the processor 755 instructs the communication device 760 to send monitored current data (including, for example, the filtered current signals, frequency of the filtered current signals, true RMS values of the filtered current signals, status message for reporting, for example, failure information during an abnormal operating condition, phase current imbalance data, phase sequence data for rotation of the compressor 725, calculated power factor data based on a phase shift between resistive loads (e.g., the electric heaters) and other loads with reactive power consumption, status information (e.g., compressor status information, contactor status information, etc.), internal electrical architecture communications, firmware updates, etc.) to the main controller portion 740. If the processor 755 determines that any of the filtered current signals is outside of the predefined acceptable ranges (e.g., an abnormal result), the processor 755 instructs the interrupt device 765 to send an interruption signal to the main controller portion 740 and then instructs the communication device 760 to send the monitored current data to the main controller portion 740.

The communication device 760 is configured to send and receive messages with the main controller portion 740. In some embodiments, the communication device 760 can be a control area network (CAN) node that sends the monitored current data to the main controller portion 740 via a CAN connection. In other embodiments, the communication device 760 can send the monitored current data to the main controller portion 740 via a wireless communication protocol.

The interrupt device 765 allows the current monitoring portion 735 to immediately communicate to the main controller portion 740 that an abnormal condition has been detected so that the main controller portion 740 can take immediate action to disable operation of the transport climate control system. In some embodiments, disabling operation of the transport climate control system can include, for example, turning off operation of any of the high voltage AC components (including, for example, the compressor, one or more electric heat exchanger heaters, a RESS charger, one or more fans/blowers, etc.). In some embodiments, disabling operation of the transport climate control system can include, for example, opening the high voltage power source contactor (e.g., the high voltage power source contactor 704a shown in FIG. 4) so that power is no longer provided via the phase lines 702a-c. Further, in some embodiments, when the high voltage three-phase AC power source 720 is a prime mover and electric machine, disabling operation of the transport climate control system can include disabling the prime mover by shutting off fuel flow from a fuel pump to the prime mover, turning off an engine control unit (ECU) of the prime mover, etc.

The main controller portion 740 includes one or more processors (not shown) and one or more memory devices (not shown) and is configured to receive the monitored current data from the current processing portion 735 and control operation of the transport climate control system (including the compressor 725 and the high voltage transport climate control components 730) based on many factors including the monitored current data.

In some embodiments, the main controller portion 740 can provide closed loop feedback control and diagnostics of the transport climate control system. The main controller portion 740 can provide closed loop feedback control of the transport climate control system by monitoring the current data received via the communication device 760. In particular, the main controller portion 740 can provide closed loop feedback control of the transport climate control system based on the current data related to the current drawn from each of the three-phase lines 702a-c by the compressor 725. When the main controller portion 740 determines that the compressor 725 is drawing current from the high voltage three-phase AC power source 720 approaching or near or exceeds a maximum current threshold, the main controller portion 740 can instruct an ETV of the transport climate control system to adjust its opening size such that the amount of working fluid directed to the compressor 725 is reduced. In some embodiments, the maximum current threshold can be, for example, 30 Amps. By reducing the working fluid directed to the compressor 725, the compressor 725 can require less power to operate and thereby reduce the amount of current drawn by the compressor 725 from the high voltage three-phase AC power source 720. Accordingly, the system 700 can provide closed loop feedback control of the transport climate control system (and particularly the compressor 725).

The main controller portion 740 can provide diagnostics of the transport climate control system based on the monitored current data received via the communication device 760. In particular, the main controller portion 740 can use current data related to the current received from the high voltage three-phase AC power source 720 via each of the three-phase lines 702a-c to i) monitor all high voltage AC components (e.g., one or more high voltage transport climate control components 730 and the compressor 725) of the transport climate control system, ii) detect a single phasing condition using a load sequencing method (e.g., the load sequencing method 800 described in FIGS. 5A and 5B below), and iii) determine overloading of the compressor 725.

Also, the main controller portion 740 can use current data related to the current drawn by the compressor 725 via each of the three-phase lines 702a-c to i) provide a closed loop feedback method (e.g., the closed loop feedback method 900 described in FIG. 6 below) for controlling the compressor 725, ii) detect an incorrect phase sequence connection to the compressor 725 (e.g., reverse rotation of the compressor 725) based on, for example, improper contactor wiring, and iii) detect a single phasing condition without using a load sequencing method.

Additionally, the main controller portion 740 can use current data related to the current received from the high voltage three-phase AC power source 720 via each of the three-phase lines 702a-c in combination with current data related to the current drawn by the compressor 725 via each of the three-phase lines 702a-c to i) isolate the load demanded by the compressor 725 from loads commanded by the other high voltage components of the transport climate control system (e.g., one or more electric heat exchanger heaters, a RESS charger, one or more fans/blowers, etc.), ii) indirectly detect a single phasing condition using an alternate phase reading, and iii) estimate a power factor by sequencing resistive loads and inductive loads.

When the main controller portion 740 receives an interruption signal from the interrupt device 765, the main controller portion automatically disables power to the compressor 725 and to all of the high voltage transport climate control components 730. The main controller portion 740 can then review the monitored current data to diagnosis faults/issues within the transport climate control system.

The power input 770 is configured to receive power for powering the current processing portion 735. In the embodiment shown in FIG. 4, the main controller portion 740 is configured to provide power to the current processing portion 735 via the power input 770. However, in other embodiments, other low voltage power sources can be used to power the current processing portion 735.

In some embodiments, the current processing portion 735 can include an optional isolation barrier 775 between the plurality of low pass filters 745 and the plurality of differential gain amplifiers 750. The isolation barrier 775 can be provide isolation between the high voltage AC power from the high voltage three-phase AC power source 720 and low voltage components of the controller 715. The optional isolation barrier 775 can be provided, for example, in embodiments where the plurality of current sensors 705 are not current transformers and thus high voltage AC current is being directed to the plurality of low pass filters 745.

Figure 5A:
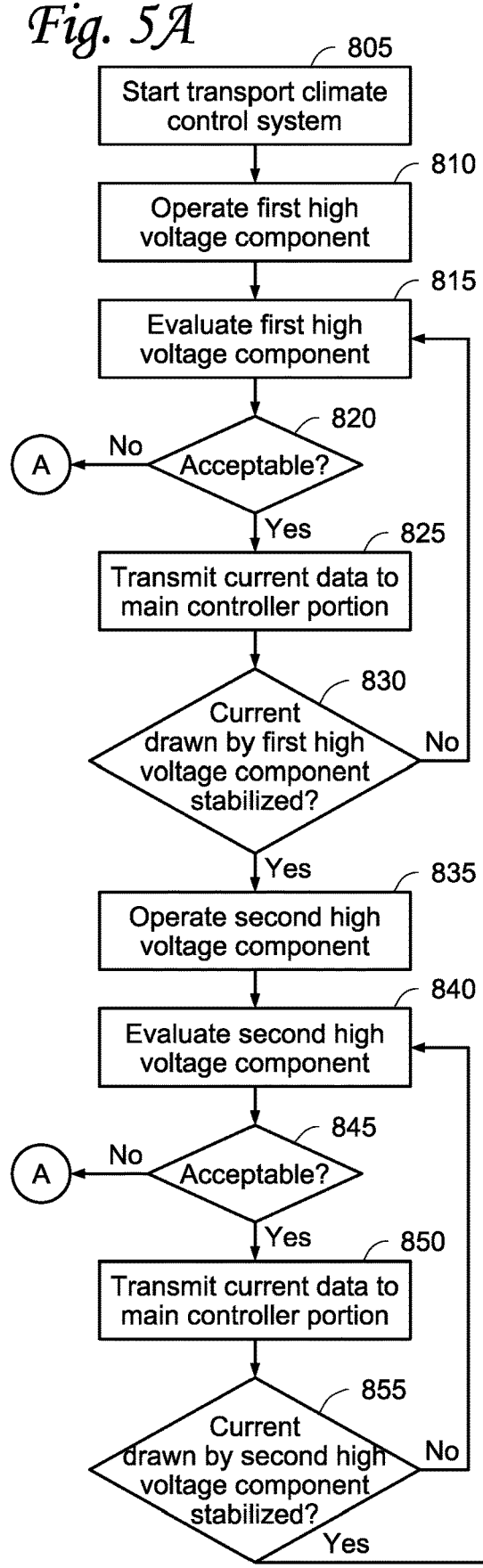
FIGS. 5A and 5B illustrate a flow chart of a load sequencing method for providing diagnostic information of a transport climate control system, according to one embodiment.
Figure 5A:
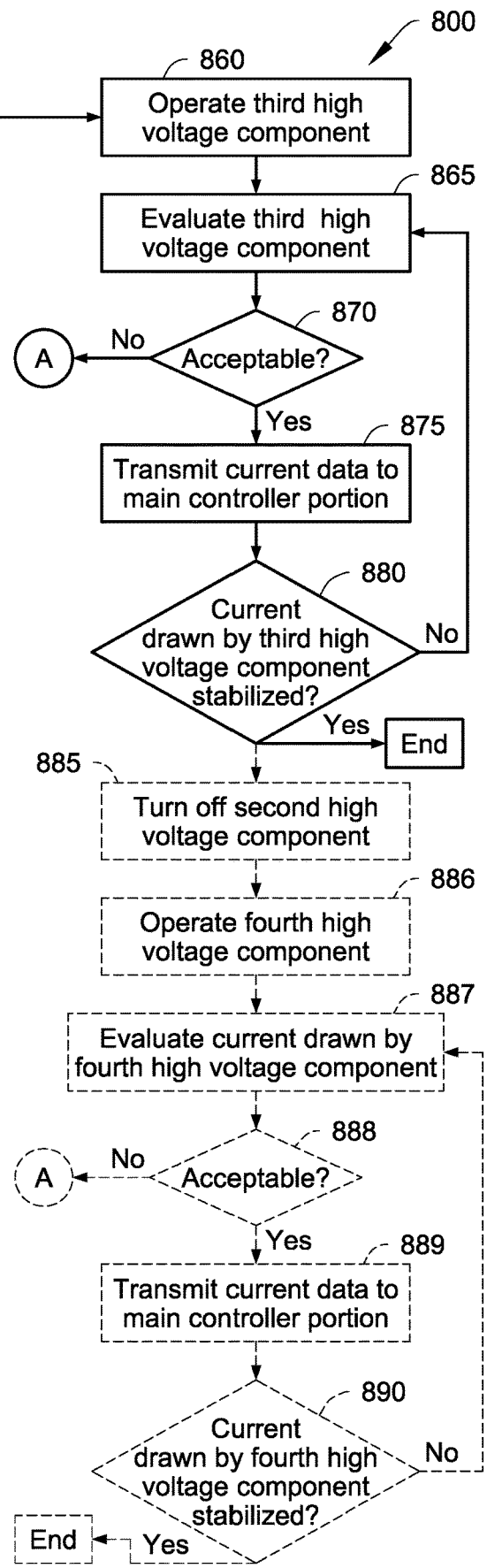
Figure 5B:
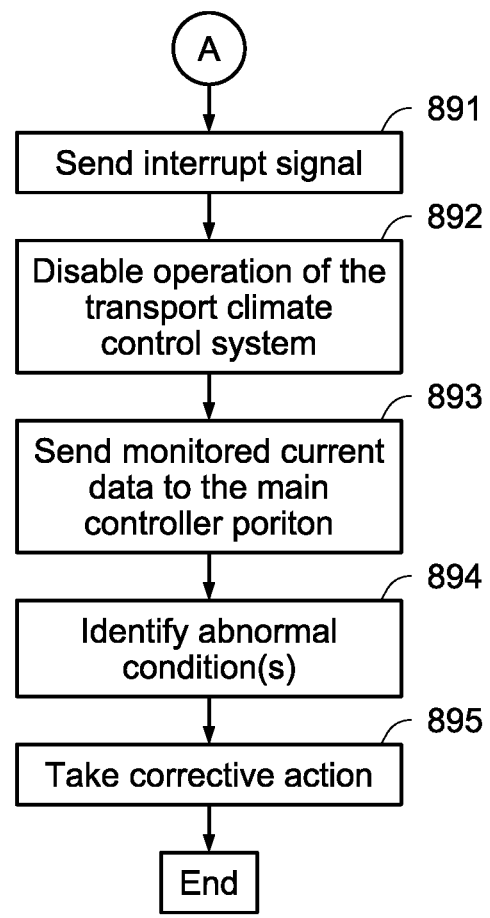

FIGS. 5A and 5B illustrate a flow chart of a load sequencing method 800 for safely starting a transport climate control system (e.g., the transport climate control systems 105, 155, 210, 280, 470 shown in FIGS. 1A-E) utilizing a closed loop feedback control and diagnostics system (e.g., the closed loop feedback control and diagnostics system 700 shown in FIG. 4), according to one embodiment.

The method 800 can safely start each of a plurality of high voltage transport climate control components (e.g., the one or more fans/blowers, the compressor, the RESS charger, the one or more electric heat exchanger heaters, etc.) in turn using feedback from the closed loop feedback control and diagnostics system. In particular, the method 800 can spread and minimize transients and/or inrush currents that can occur when starting the high voltage transport climate control components. Generally, the load sequencing method 800 can be performed to operate stable and insensitive high voltage transport climate control component first (e.g., fans/blowers), followed by the high voltage transport climate control component requiring the largest current draw (e.g., the compressor), and then lastly more sensitive transport climate control components (e.g., the RESS charger). While the embodiment shown in FIGS. 5A and 5B illustrate a load sequencing method with at most four high voltage transport climate control components, it will be appreciated that in other embodiments the number of high voltage transport climate control components can vary a load sequencing method can be performed based on the principles discussed herein. It will be appreciated that the embodiments described herein can also be used to perform a load sequencing method for safely turning off operation of the transport climate control system in a manner using the principles described herein to prevent damage to the transport climate control system. Also, the load sequencing method 800 can directly monitor both current provided a high voltage three-phase AC power source and current drawn by at least one transport climate control system component (e.g., a compressor). Accordingly, the load sequencing method 800 can detect a single phasing condition.

The method 800 begins at 805 whereby a main controller portion (e.g., the main controller portion 740 shown in FIG. 4) receives an instruction to start the transport climate control system (e.g., the transport climate control systems 105, 155, 210, 280, 470 shown in FIGS. 1A-E). The method 800 then proceeds to 810.

At 810, the main controller portion instructs a first high voltage transport climate control component of the transport climate control system to operate, while the other high voltage transport climate control components remain off. In some embodiments, the first high voltage transport climate control component can draw less current from a high voltage three-phase AC power source (e.g., the high voltage three-phase AC power source 720 shown in FIG. 4) to operate than, for example, a second high voltage transport climate control component. In some embodiments, the first high voltage transport climate control component can be one or more high voltage AC powered fans/blowers of the transport climate control system (e.g., the fans/blowers 640a-c shown in FIG. 3). Operating the high voltage AC powered fans/blowers prior to operating any of the other high voltage transport climate control components (e.g., a compressor) can help equalize the electrical architecture (e.g., the electrical architecture 600 shown in FIG. 3), allow for easier phase sequence detection, and can prevent current draw waveforms from the high voltage AC powered fans/blowers from becoming hidden when operating with the other high voltage transport climate control components.

Instructing the first high voltage transport climate control component to operate can include the main controller portion instructing the corresponding high voltage transport climate control component contactors (e.g., the fan/flower contactors 675 shown in FIG. 3) and the high voltage power source contactor (e.g., the high voltage power source contactor 704 shown in FIG. 4) to be in a closed state so that the first high voltage transport climate control component can draw current from the high voltage three-phase AC power source (e.g., the high voltage three-phase AC power source 720 shown in FIG. 4). In some embodiments, when the first high voltage transport climate control component is one or more high voltage AC powered fans/blowers, the main controller portion can also instruct the one or more high voltage AC powered fans/blowers to operate at one of a low speed, a high speed, or a predefined variable speed and remain in a steady state operation until the method 800 is ended. The method 800 then proceeds to 815.

At 815, the current drawn by the first high voltage transport climate control component is evaluated. This can include the current processing portion receiving one or more messages from the main controller portion via a communication device (e.g., the communication device 760 shown in FIG. 4) indicating, for example, that the high voltage transport climate control component contactor corresponding to the first high voltage transport climate control component and the high voltage power source contactor have been closed, the operating instructions of the first high voltage transport climate control component, etc. Also, this can include a plurality of source current sensors (e.g., the source current sensors 705a,b shown in FIG. 4) monitoring current provided by the high voltage three-phase AC power source via at least two of the three phase lines (e.g., the phase lines 702a-c shown in FIG. 4). This can also include the processor receiving the current signals from each of the plurality of source current sensors and processing the current signals to obtain current data indicating an amount of current provided by the high voltage three-phase AC power source via each of the three phase lines and current data indicating a phase sequence of current provided by the high voltage three-phase AC power source via the three phase lines.

In some embodiments, processing the current signals can include passing each of the current signals through a low pass filter (e.g., the low pass filters 745 shown in FIG. 4) and a differential gain amplifier (e.g., the differential gain amplifier 750 shown in FIG. 4). In some embodiments, processing the current signals can also include a processor (e.g., the processor 755 shown in FIG. 4) of the current processing portion calculating a frequency and a true root mean square (RMS) current value of the current signals. Also, in embodiments where there are only two source current sensors monitoring only two of the three phase lines, the processor can calculate the current provided by the high voltage three-phase AC power source via the unmonitored phase line based on the current signals obtained from the two monitored phase lines to obtain current data indicating an amount of current provided by the high voltage three-phase AC power source via each of the three phase lines and thereby the amount of current demanded by the first high voltage transport climate control component. The method 800 then proceeds to 820.

At 820, the processor then uses the current data indicating the amount of current provided by the high voltage three-phase AC power source via each of the three phase lines to determine whether the amount of current drawn by the first high voltage transport climate control component is within a predefined acceptable first component current range. The predefined acceptable first component current range is a range of current values that indicate normal operating conditions of the first high voltage transport climate control component.

The processor can determine that the predefined acceptable first component current range to be used based on the message(s) received from the main controller portion indicating, for example, that the high voltage transport climate control component contactor corresponding to the first high voltage transport climate control component and the high voltage power source contactor have been closed, the operating instructions of the first high voltage transport climate control component, etc.

If the current drawn by the first high voltage transport climate control component via all three phase lines is within the predefined acceptable first component current range, the method 800 proceeds to 825. If the current drawn by the first high voltage transport climate control component via any of the three phase lines is outside the predefined acceptable first component current range, the method 800 proceeds to A.

At 825, the current processing portion transmits the current data indicating the amount of current drawn by the first high voltage transport climate control component along with the current signals from each of the plurality of source current sensors to the main controller portion via the communication device (e.g., the communication device 760 shown in FIG. 4). The main controller portion can use this information (via, for example, a telematics unit) to enable, for example, future diagnostics, preventative maintenance, etc. and to understand better understand transport climate control system utilization. The main controller portion can also use this information, for example, to monitor operation of the first high voltage transport climate control component and the corresponding high voltage transport climate control component contactor(s) and to verify that the first high voltage transport climate control component are operating as instructed. The method 800 then proceeds to 830.

At 830, the processor continues to monitor current drawn by the first high voltage transport climate control component to see if the current has stabilized (e.g., current transients and/or inrush currents have been minimized). If the processor determines that the current has stabilized, the method 800 proceeds to 835. If the processor determines that the current has not stabilized, the method 800 proceeds back to 815.

At 835, the main controller portion instructs a second high voltage transport climate control component of the transport climate control system to operate in addition to the first high voltage transport climate control component, while the other remaining high voltage transport climate control components remain off. In some embodiments, the second high voltage transport climate control component can be a compressor of the transport climate control system (e.g., the compressor 505 shown in FIG. 2, the compressor 625 shown in FIG. 3, the compressor 725 shown in FIG. 4, etc.). Typically, the compressor can require the most amount of current to operate among the high voltage transport climate control components and can have the amount the highest variance in terms of current drawn from the high voltage three-phase AC power source. By operating the first high voltage transport climate control component (e.g., the one or more fans/blowers) prior to operating the second high voltage transport climate control component (e.g., the compressor), the first high voltage transport climate control component can act as a filter to help absorb transients and/or inrush currents occurring due to the current draw from the second high voltage transport climate control component.

Instructing the second high voltage transport climate control component to operate can include the main controller portion instructing the corresponding high voltage transport climate control component contactors (e.g., the compressor contactor 665 shown in FIG. 3, the compressor contactor 704b shown in FIG. 4) to be in a closed state and the first high voltage transport climate control component contactors and the high voltage power source contactor (e.g., the high voltage power source contactor 704 shown in FIG. 4) to remain in a closed state so that both the first high voltage transport climate control component and the second high voltage transport climate control component can draw current from the high voltage three-phase AC power source (e.g., the high voltage three-phase AC power source 720 shown in FIG. 4). The method 800 then proceeds to 840.

At 840, the current drawn by the second high voltage transport climate control component is evaluated. This can include the current processing portion receiving one or more messages from the main controller portion via a communication device indicating, for example, that the high voltage transport climate control component contactors corresponding to the first and second high voltage transport climate control components and the high voltage power source contactor are closed, the operating instructions of the second high voltage transport climate control component, etc. Also, this can include a plurality of second high voltage transport climate control component current sensors (e.g., the compressor current sensors 710a,b shown in FIG. 4) monitoring current drawn by the second high voltage transport climate control component from the high voltage three-phase AC power source via at least two of the three phase lines (e.g., the phase lines 702a-c shown in FIG. 4). This can also include the plurality of source current sensors monitoring current provided by the high voltage three-phase AC power source via at least two of the three phase lines. Further, this can include the processor receiving the current signals from each of the plurality of second high voltage transport climate control component current sensors and from each of the plurality of source current sensors and processing the current signals to obtain current data indicating an amount of current drawn by the second high voltage transport climate control component from the high voltage three-phase AC power source via each of the three phase lines and current data indicating a phase sequence of current provided by the high voltage three-phase AC power source via the three phase lines. In some embodiments, the processor can verify the current data indicating the amount of current drawn by the second high voltage transport climate control component from the high voltage three-phase AC power source via each of the three phase lines by using vector calculations to subtract the current data indicating the amount of current drawn by the first high voltage transport climate control component obtained at 815 from the current data indicating the amount of current provided by the high voltage three-phase AC power source obtained at 840. The processor can then compare the current data indicating the amount of current drawn by the second high voltage transport climate control component with the subtraction current data. Also, in some embodiments, the processor can verify the phase sequence by comparing the phase sequence determined using current signals from the second high voltage transport climate control component current sensors with the phase sequence determined using the current signals from the source current sensors.

In some embodiments, processing the current signals can include passing each of the current signals through a low pass filter and a differential gain amplifier. In some embodiments, processing the current signals can also include the processor calculating a frequency and a true RMS current value of the current signals. Also, in embodiments where there are only two second high voltage transport climate control component current sensors monitoring only two of the three phase lines, the processor can calculate the current drawn by the second high voltage transport climate control component via the unmonitored phase line based on the current signals obtained from the two monitored phase lines to obtain current data indicating an amount of current drawn by the second high voltage transport climate control component via each of the three phase lines. Similarly, in embodiments where there are only two source current sensors monitoring only two of the three phase lines, the processor can calculate the current provided by the high voltage three-phase AC power source via the unmonitored phase line based on the current signals obtained from the two monitored phase lines. The method 800 then proceeds to 845.

At 845, the processor then uses the current data indicating the amount of current drawn by the second high voltage transport climate control component via each of the three phase lines to determine whether the amount of current drawn by the second high voltage transport climate control component is within a predefined acceptable second component current range. The predefined acceptable second component current range is a range of current values that indicate normal operating conditions of the second high voltage transport climate control component.

The processor can determine that the predefined acceptable second component current range to be used based on the message(s) received from the main controller portion indicating, for example, that the high voltage transport climate control component contactors corresponding to the first and second high voltage transport climate control components and the high voltage power source contactor have been closed, the operating instructions of the first and second high voltage transport climate control components, etc.

If the current drawn by the second high voltage transport climate control component via all three phase lines is within the predefined acceptable second component current range, the method 800 proceeds to 850. If the current drawn by the second high voltage transport climate control component via any of the three phase lines is outside the predefined acceptable second component current range, the method 800 proceeds to A.

At 850, the current processing portion transmits the current data indicating the amount of current drawn by the second high voltage transport climate control component along with the current signals from each of the plurality of source current sensors and each of the plurality of second high voltage transport climate component current sensors to the main controller portion via the communication device. The main controller portion can use this information (via, for example, a telematics unit) to enable, for example, future diagnostics, preventative maintenance, etc. and to understand better understand transport climate control system utilization. The main controller portion can also use this information, for example, to monitor operation of the first and second high voltage transport climate control components and the corresponding high voltage transport climate control component contactor(s) and to verify that the first and second high voltage transport climate control components are operating as instructed. The method 800 then proceeds to 855.

At 855, the processor continues to monitor current drawn by the second high voltage transport climate control component to see if the current has stabilized (e.g., current transients and or inrush currents have been minimized). If the processor determines that the current has stabilized, the method 800 proceeds to 860. If the processor determines that the current has not stabilized, the method 800 proceeds back to 840.

At 860, the main controller portion instructs a third high voltage transport climate control component of the transport climate control system to operate in addition to the first and second high voltage transport climate control components, while the other remaining high voltage transport climate control components remain off. In some embodiments, the third high voltage transport climate control component can be a RESS charger of the transport climate control system (e.g., the RESS charger 635 shown in FIG. 3, etc.). Typically, the RESS charger can be the most sensitive component to current transients and/or inrush currents among the high voltage transport climate control components. By operating the first high voltage transport climate control component (e.g., the one or more fans/blowers) and the second high voltage transport climate control component (e.g., the compressor) prior to operating the third high voltage transport climate control component (e.g., the RESS charger), the electrical architecture can be sufficiently stabilized to prevent the third high voltage transport climate control component from being exposed to a current transient and/or inrush current that can cause damage to the third high voltage transport climate control component.

Instructing the third high voltage transport climate control component to operate can include the main controller portion instructing the corresponding high voltage transport climate control component contactors (e.g., the RESS charger contactor 670 shown in FIG. 3) to be in a closed state and the first and second high voltage transport climate control component contactors and the high voltage power source contactor (e.g., the high voltage power source contactor 704 shown in FIG. 4) to remain in a closed state so that the first, second and third high voltage transport climate control components can draw current from the high voltage three-phase AC power source (e.g., the high voltage three-phase AC power source 720 shown in FIG. 4). The method 800 then proceeds to 865.

At 865, the current drawn by the third high voltage transport climate control component is evaluated. This can include the current processing portion receiving one or more messages from the main controller portion via a communication device indicating, for example, that the high voltage transport climate control component contactors corresponding to the first, second and third high voltage transport climate control components and the high voltage power source contactor are closed, the operating instructions of the third high voltage transport climate control component, etc. This can also include the plurality of source current sensors monitoring current provided by the high voltage three-phase AC power source via at least two of the three phase lines. Also, this can include the plurality of second high voltage transport climate control component current sensors monitoring current drawn by the second high voltage transport climate control component from the high voltage three-phase AC power source via at least two of the three phase lines. Further, this can include the processor receiving the current signals from each of the plurality of source current sensors and from each of the plurality of second high voltage transport climate control component current sensors and processing the current signals to obtain current data indicating an amount of current drawn by the third high voltage transport climate control component from the high voltage three-phase AC power source via each of the three phase lines and current data indicating a phase sequence of current provided by the high voltage three-phase AC power source via the three phase lines.

In some embodiments, the processor can calculate the current data indicating the amount of current drawn by the third high voltage transport climate control component from the high voltage three-phase AC power source via each of the three phase lines by a series of calculations. These calculations can include using vector calculations to subtract the current signals from the second high voltage transport climate control component current sensors obtained at 865 from the current signals from the source current sensors obtained at 865 to determine the amount of current drawn by both the first and third high voltage transport climate control components. Using additional vector calculations, the current data indicating the amount of current drawn by the first high voltage transport climate control component obtained at 815 or via data obtained at 840 can then be subtracted from the current data indicating the amount of current drawn by the first and third high voltage transport climate control components in order to calculate the current data indicating the amount of current drawn by the third high voltage transport climate control component from the high voltage three-phase AC power source via each of the three phase lines.

Also, in some embodiments, the processor can again verify the phase sequence by comparing the phase sequence determined using current signals from the second high voltage transport climate control current sensors with the phase sequence determined using the current signals from the source current sensors.

In some embodiments, processing the current signals can include passing each of the current signals through a low pass filter and a differential gain amplifier. In some embodiments, processing the current signals can also include the processor calculating a frequency and a true RMS current value of the current signals. Also, in embodiments where there are only two second high voltage transport climate control component current sensors monitoring only two of the three phase lines, the processor can calculate the current drawn by the second high voltage transport climate control component via the unmonitored phase line based on the current signals obtained from the two monitored phase lines to obtain current data indicating an amount of current drawn by the second high voltage transport climate control component via each of the three phase lines. Similarly, in embodiments where there are only two source current sensors monitoring only two of the three phase lines, the processor can calculate the current provided by the high voltage three-phase AC power source via the unmonitored phase line based on the current signals obtained from the two monitored phase lines. The method 800 then proceeds to 870.

At 870, the processor then uses the current data indicating the amount of current drawn by the third high voltage transport climate control component via each of the three phase lines to determine whether the amount of current drawn by the third high voltage transport climate control component is within a predefined acceptable third component current range. The predefined acceptable third component current range is a range of current values that indicate normal operating conditions of the third high voltage transport climate control component.

The processor can determine that the predefined acceptable third component current range to be used based on the message(s) received from the main controller portion indicating, for example, that the high voltage transport climate control component contactors corresponding to the first, second and third high voltage transport climate control components and the high voltage power source contactor have been closed, the operating instructions of the first, second and third high voltage transport climate control components, etc.

If the current drawn by the third high voltage transport climate control component via all three phase lines is within the predefined acceptable third component current range, the method 800 proceeds to 875. If the current drawn by the third high voltage transport climate control component via any of the three phase lines is outside the predefined acceptable third component current range, the method 800 proceeds to A.

At 875, the current processing portion transmits the current data indicating the amount of current drawn by the third high voltage transport climate control component along with the current signals from each of the plurality of source current sensors and each of the plurality of second high voltage transport climate component current sensors to the main controller portion via the communication device. The main controller portion can use this information (via, for example, a telematics unit) to enable, for example, future diagnostics, preventative maintenance, etc. and to understand better understand transport climate control system utilization. The main controller portion can also use this information, for example, to monitor operation of the first, second and third high voltage transport climate control components and the corresponding high voltage transport climate control component contactor(s) and to verify that the first, second and third high voltage transport climate control components are operating as instructed. The method 800 then proceeds to 880.

At 880, the processor continues to monitor current drawn by the third high voltage transport climate control component to see if the current has stabilized (e.g., current transients and/or inrush currents have been minimized). If the processor determines that the current has stabilized, the method 800 ends or optionally proceeds to 885. If the processor determines that the current has not stabilized, the method 800 proceeds back to 865.

When the transport climate control system includes one or more electric heaters, the method 800 can use load sequencing to verify that the one or more electric heaters are operating correctly. At optional 885, when a fourth high voltage transport climate control component of the transport climate control system (e.g., the electric heat exchanger heaters 630*a,b*) is to be started, the main controller portion first instructs the second high voltage transport climate control component and optionally the first high voltage transport climate control component to stop operation. This can include the main controller portion instructing the corresponding high voltage transport climate control component contactors (e.g., the compressor contactor 664 shown in FIG. 3, the compressor contactor 704*b* shown in FIG. 4, and optionally the fan/blower contactors 675*a-c* shown in FIG. 3) to be in an open state so that the second and optionally first high voltage transport climate control components cannot draw current from the high voltage AC power source. In some embodiments, the main controller portion can stop operation of the first transport climate control component when the transport climate control system is operating, for example, in a defrost mode. In some embodiments, the main controller portion can continue to operate the first transport climate control component when the transport climate control system is operating, for example, in a heating mode. The method 800 then proceeds to optional 886.

At optional 886, the main controller portion instructs the fourth high voltage transport climate control component to operate in addition to the third and possibly first high voltage transport climate control components, while the other remaining high voltage transport climate control components remain off.

Instructing the fourth high voltage transport climate control component to operate can include the main controller portion instructing the corresponding high voltage transport climate control component contactors (e.g., the two heater contactors 660a,b shown in FIG. 3) to be in a closed state and the third and optionally first high voltage transport climate control component contactors and the high voltage power source contactor to remain in a closed state so that the third, fourth and optionally first high voltage transport climate control components can draw current from the high voltage three-phase AC power source (e.g., the high voltage three-phase AC power source 720 shown in FIG. 4). The method 800 then proceeds to optional 887.

At optional 887, the current drawn by the fourth high voltage transport climate control component is evaluated. This can include the current processing portion receiving one or more messages from the main controller portion via a communication device indicating, for example, that the high voltage transport climate control component contactors corresponding to the third, fourth and optionally first high voltage transport climate control components and the high voltage power source contactor are closed, the operating instructions of the fourth high voltage transport climate control component, etc. This can also include the plurality of source current sensors monitoring current provided by the high voltage three-phase AC power source via at least two of the three phase lines. Further, this can include the processor receiving the current signals from each of the plurality of source current sensors and processing the current signals to obtain current data indicating an amount of current drawn by the fourth high voltage transport climate control component from the high voltage three-phase AC power source via each of the three phase lines and current data indicating a phase sequence of current provided by the high voltage three-phase AC power source via the three phase lines.

In some embodiments, the processor can calculate the current data indicating the amount of current drawn by the fourth high voltage transport climate control component from the high voltage three-phase AC power source via each of the three phase lines by a series of calculations. These calculations can include using vector calculations to subtract current data indicating the amount of current drawn by the third and optionally first transport climate control components obtained at 865 from the current signals from the source current sensors obtained at optional 887 to determine the amount of current drawn by fourth high voltage transport climate control component.

Also, in some embodiments, the processor can again verify the phase sequence by comparing the phase sequence determined at 865 with the phase sequence determined using current signals from the source current sensors obtained at optional 887.

In some embodiments, processing the current signals can include passing each of the current signals through a low pass filter and a differential gain amplifier. In some embodiments, processing the current signals can also include the processor calculating a frequency and a true RMS current value of the current signals. Also, in embodiments where there are only two source current sensors monitoring only two of the three phase lines, the processor can calculate the current provided by the high voltage three-phase AC power source via the unmonitored phase line based on the current signals obtained from the two monitored phase lines.

In some embodiments, when the fourth high voltage transport climate control component is one or more electric heaters, the load sequencing method 800 can be used to calculate a power factor expected from the other currently operating inductive high voltage transport climate control components (e.g., the third high voltage transport climate control component and optionally the first high voltage transport climate control component). It will be appreciated that electric heaters generally operate as a resistive load. Accordingly, the three-phase AC current passing through the one or more electric heaters should be in phase with the three-phase AC voltage. The current passing through the third high voltage transport climate control component (e.g., the RESS charger) and/or the current optionally passing through the first high voltage transport climate control component (e.g., one or more high voltage AC fans/blowers) generally operate as an inductive load. Thus, by calculating a phase shift between the current drawn by the fourth high voltage transport climate control component determined at 887 with the current drawn by the third high voltage transport climate component or the optionally the first high voltage transport climate control component obtained at 865 or optionally 815, the processor can determine the power factor of the third or optionally first high voltage transport climate control components. It will be appreciated that in some embodiments, the processor can also determine a power factor of the compressor by keeping the compressor on and using current signals from the compressor current sensors in combination with the source current sensors and then calculating a phase shift between the current drawn by the fourth high voltage transport climate control component with the current drawn by the compressor. The method 800 then proceeds to optional 888.

At optional 888, the processor then uses the current data indicating the amount of current drawn by the fourth high voltage transport climate control component via each of the three phase lines to determine whether the amount of current drawn by the fourth high voltage transport climate control component is within a predefined acceptable fourth component current range. The predefined acceptable fourth component current range is a range of current values that indicate normal operating conditions of the fourth high voltage transport climate control component.

The processor can determine that the predefined acceptable fourth component current range to be used based on the message(s) received from the main controller portion indicating, for example, that the high voltage transport climate control component contactors corresponding to the third, fourth and optionally first high voltage transport climate control components and the high voltage power source contactor have been closed, the operating instructions of the third, fourth and optionally first high voltage transport climate control components, etc.

If the current drawn by the fourth high voltage transport climate control component via all three phase lines is within the predefined acceptable fourth component current range, the method 800 proceeds to optional 889. If the current drawn by the fourth high voltage transport climate control component via any of the three phase lines is outside the predefined acceptable fourth component current range, the method 800 proceeds to A.

At 889, the current processing portion transmits the current data indicating the amount of current drawn by the fourth high voltage transport climate control component along with the current signals from each of the plurality of source current sensors to the main controller portion via the communication device. The main controller portion can use this information (via, for example, a telematics unit) to enable, for example, future diagnostics, preventative maintenance, etc. and to understand better understand transport climate control system utilization. The main controller portion can also use this information, for example, to monitor operation of the third, fourth and optionally first high voltage transport climate control components and the corresponding high voltage transport climate control component contactor(s) and to verify that the third, fourth and optionally first high voltage transport climate control component are operating as instructed. The method 800 then proceeds to 890.

At 890, the processor continues to monitor current drawn by the fourth high voltage transport climate control component to see if the current has stabilized (e.g., current transients and/or inrush currents have been minimized). If the processor determines that the current has stabilized, the method 800 ends. If the processor determines that the current has not stabilized, the method 800 proceeds back to optional 887.

At A, the method 800 proceeds to 891. At 891, the processor determines that one or more abnormal conditions has occurred and instructs an interrupt device (e.g., the interrupt device 765 shown in FIG. 4) to send an interrupt signal to the main controller portion. The method 800 then proceeds to 892. At 892, the main controller portion receives the interrupt signal and immediately disables operation of the transport climate control system. In some embodiments, disabling operation of the transport climate control system can include, for example, turning off operation of any of the first, second third or fourth high voltage transport climate control components (including, for example, the compressor, one or more electric heat exchanger heaters, a RESS charger, one or more fans/blowers, etc.). In some embodiments, disabling operation of the transport climate control system can include, for example, opening the high voltage power source contactor so that power is no longer provided via the phase lines. Further, in some embodiments, when the high voltage three-phase AC power source is a prime mover and electric machine, disabling operation of the transport climate control system can include disabling the prime mover by shutting off fuel flow from a fuel pump to the prime mover, turning off an engine control unit (ECU) of the prime mover, etc. Accordingly, the method 800 can detect an abnormal condition faster than by detecting an abnormal condition based on monitoring, for example, pressures in the transport climate control circuit. The method 800 then proceeds to 893.

At 893, once the main controller portion disables operation of the transport climate control system, the processor then sends the monitored current signals from the at least two source current sensors and the at least two second high voltage transport climate control component current sensors to the main controller portion. In some embodiments, the processor can also send a status message with information regarding a potential cause of the abnormal condition (e.g., an overcurrent condition, an incorrect phase sequence, a current imbalance, a single phasing condition, an overload condition, a damaged contactor condition, etc.). The method 800 then proceeds to 894.

At 894, the main identifies what abnormal condition(s) occurred based on the monitored current signals received at 893. The abnormal condition(s) that can be identified based on the monitored current signals from the second high voltage transport climate control component current sensors can include, for example, a) detecting an incorrect phase sequence connection to the compressor (e.g., reverse rotation of the compressor 725) based on, for example, improper contactor wiring, b) detecting a single phasing condition associated with, for example, a poor connection to the compressor (e.g., stuck contactor, open wire, etc.), c) a current imbalance between the three phases, d) an overload condition, etc. The abnormal condition(s) that can be identified based on the monitored current signals from the source current sensors can include, for example, a) detecting a single phasing condition associated with, for example, a poor connection between the high voltage three-phase AC power source and one or more of the high voltage transport climate control components (e.g., one or more electric heat exchanger heaters, the compressor a RESS charger, one or more fans/blowers, etc.), etc. The abnormal condition(s) that can be identified based on the monitored current signals from the second high voltage transport climate control component current sensors in combination with the monitored current signals from source current sensors can include, for example, a) detecting connection status of each of the high voltage transport climate control components (e.g., stuck contactor, open wire, etc.), b) indirectly detecting a single phasing condition associated with, for example, a poor connection with one or more of the high voltage transport climate control components, c) overloading of the compressor, etc.

It will be appreciated that by disabling operation of the transport climate control system at 892 first before the main controller portion receives the monitored current signals via the communication device at 893 and identifies any abnormal condition(s) at 894, the transport climate control system can prevent harmful and/or permanent damage to components of the electrical architecture and to the high voltage components of the transport climate control system that could otherwise occur if the transport climate control system is not disabled prior to the main controller portion identifying any abnormal condition(s). The method 800 then proceeds to 895.

At 895, the main controller portion takes corrective action based on the abnormal condition(s) identified at 894. In some embodiments, corrective action can include sending a status message, for example, to a vehicle operator, an owner of cargo being transport via a transport unit with the transport climate control system, etc. In some embodiments, the status message can be displayed, for example, on a human machine interface (HMI) of the transport climate control system. In some embodiments, corrective action can include the main controller portion disabling a high voltage three-phase AC power source from powering the electrical architecture and thereby prevent high voltage exposure. In some embodiments, corrective action can include providing a user with a recommended preventive maintenance procedure using, for example, a telematics device.

Figure 6:
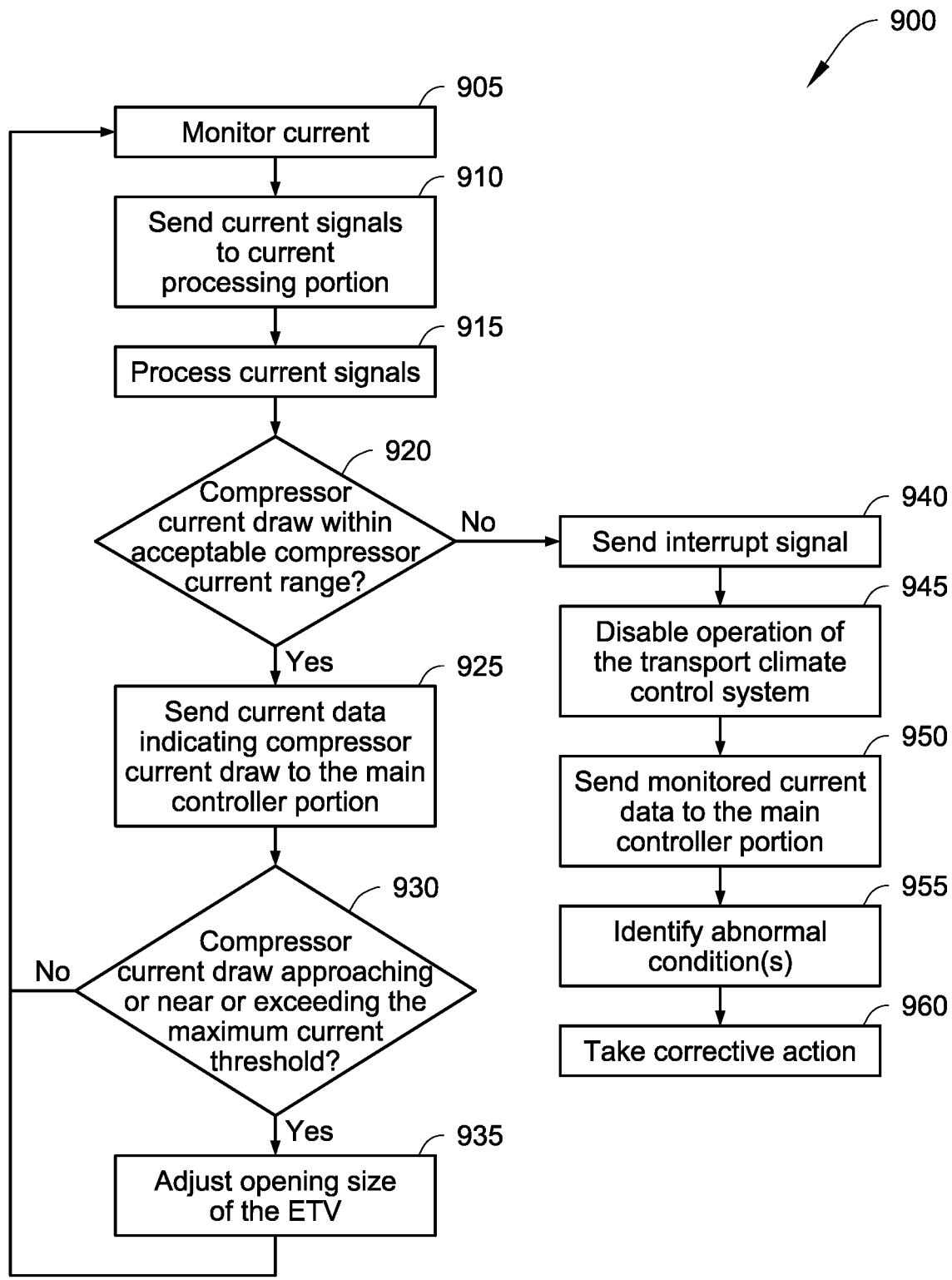
FIG. 6 illustrates a flowchart of a method for closed loop feedback control of a transport climate control system, according to one embodiment.

FIG. 6 illustrates a flow chart of one embodiment of a method 900 for providing closed loop feedback control of a compressor (e.g., the compressor 725 shown in FIG. 4) utilizing a closed loop feedback and diagnostic system (e.g., the closed loop feedback control and diagnostics system 700 shown in FIG. 4).

The method 900 begins at 905 whereby, during operation of the compressor, a plurality of compressor current sensors (e.g., the compressor current sensors 710*a,b* shown in FIG. 4) monitor current drawn by the compressor from the high voltage three-phase AC power source (e.g., the high voltage three-phase AC power source 720 shown in FIG. 4) via at least two of the three phase lines (e.g., the phase lines 702*a-c* shown in FIG. 4). The method 900 then proceeds to 910.

At 910, each of the plurality of compressor current sensors sends a current signal indicating a current drawn by the compressor via one of the phase lines to a current processing portion of a controller (e.g., the current processing portion 735 of the controller 715). Concurrently, each of the plurality of source current sensors sends a current signal indicating a current provided by the high voltage three-phase AC power source via one of the phase lines to a current processing portion. The method 900 then proceeds to 915.

At 915, the current processing portion receives the current signals from each of the plurality of compressor current sensors and processes the current signals to obtain current data indicating an amount of current drawn by the compressor from the high voltage three-phase AC power source via each of the three phase lines. Also, the current processing portion receives the current signals from each of the plurality of source current sensors and processes the current signals to obtain current data indicating an amount of current provided by the high voltage three-phase AC power source via each of the three phase lines. In some embodiments, processing the current signals can include passing the current signals through a low pass filter (e.g., the low pass filters 745 shown in FIG. 4) and a differential gain amplifier (e.g., the differential gain amplifier 750 shown in FIG. 4). In some embodiments, processing the current signals can also include a processor (e.g., the processor 755 shown in FIG. 4) of the current processing portion calculating a frequency and a true root mean square (RMS) current value of the current signals. Also, in embodiments where there are only two compressor current sensors monitoring only two of the three phase lines, the processor can calculate the current drawn by the compressor via the unmonitored phase line based on the current signals obtained from the two monitored phase lines to obtain current data indicating an amount of current drawn by the compressor from the high voltage three-phase AC power source via each of the three phase lines. Similarly, in embodiments where there are only two source current sensors monitoring only two of the three phase lines, the processor can calculate the current provided by the high voltage three-phase AC power source via the unmonitored phase line based on the current signals obtained from the two monitored phase lines to obtain current data indicating an amount of current provided by the high voltage three-phase AC power source via each of the three phase lines. The method 900 then proceeds to 920.

At 920, the processor uses the current data indicating the amount of current drawn by the compressor from the high voltage three-phase AC power source via each of the three phase lines to determine whether the amount of current drawn by the compressor from the high voltage three-phase AC power source via each of the three phase lines is within a predefined acceptable compressor current range. The predefined acceptable compressor current range is a range of current values that indicate normal operating conditions of the compressor and can vary based on the components and operation of the transport climate control system. If the current drawn by the compressor from the high voltage three-phase AC power source via all three phase lines is within the predefined acceptable compressor current range, the method 900 proceeds to 925. If the current drawn by the compressor from the high voltage three-phase AC power source via any of the three phase lines is outside the predefined acceptable compressor current range, the method 900 proceeds to 940.

At 925, the current processing portion sends the current data indicating the amount of current drawn by the compressor from the high voltage three-phase AC power source via each of the three phase lines to a main controller portion (e.g., the main controller portion 740 shown in FIG. 4) via a communication device (e.g., the communication device 760 shown in FIG. 4).

In some embodiments, the current processing portion can also send the current data indicating the amount of current provided by the high voltage three-phase AC power source via each of the three phase lines to the main controller portion via the communication device. The method 900 then proceeds to 930.

At 930, the main controller portion determines whether monitored current data indicating the amount of current drawn by the compressor from the high voltage three-phase AC power source via each of the three phase lines is approaching or near or exceeds a maximum current threshold. In some embodiments, the main controller portion can determine that the amount of current drawn by the compressor is approaching or near or exceeds the maximum current threshold when the amount of current drawn by the compressor is within, for example, 80% of the maximum current threshold. In some embodiments, the maximum current threshold can be, for example, 30 Amps. In this example, the main controller portion can determine that the amount of current drawn by the compressor is approaching or near or exceeds the maximum current threshold when the amount of current drawn by the compressor is at or greater than 24 Amps.

If the main controller portion determines that the amount of current drawn by the compressor is approaching or near or exceeds the maximum current threshold, the method 900 proceeds to 935. If the main controller portion determines that the amount of current drawn by the compressor is not approaching or near or exceeding the maximum current threshold, the method 900 proceeds back to 905.

At 935, the main controller portion instructs an ETV of the transport climate control system (e.g., the ETV 525 shown in FIG. 2) to adjust its opening size such that the amount of working fluid directed to the compressor is reduced. By reducing the working fluid directed to the compressor, the compressor can require less power to operate and thereby reduce the amount of current drawn by the compressor from the high voltage three-phase AC power source. Accordingly, the system 700 can provide closed loop feedback control of the transport climate control system (and particularly the compressor 725). The method 900 then proceeds back to 905.

At 940, the processor determines that one or more abnormal conditions has occurred and instructs an interrupt device (e.g., the interrupt device 765 shown in FIG. 4) to send an interrupt signal to the main controller portion. The method 900 then proceeds to 945. At 945, the main controller portion receives the interrupt signal and immediately disables operation of the transport climate control system. In some embodiments, disabling operation of the transport climate control system can include, for example, turning off operation of any of the high voltage AC components (including, for example, the compressor, one or more electric heat exchanger heaters, a RESS charger, one or more fans/blowers, etc.). In some embodiments, disabling operation of the transport climate control system can include, for example, opening the high voltage power source contactor (e.g., the high voltage power source contactor 704a shown in FIG. 4) so that power is no longer provided via the phase lines 702a-c. Further, in some embodiments, when the high voltage three-phase AC power source 720 is a prime mover and electric machine, disabling operation of the transport climate control system can include disabling the prime mover by shutting off fuel flow from a fuel pump to the prime mover, turning off an engine control unit (ECU) of the prime mover, etc. Accordingly, the method 900 can detect an abnormal condition faster than by detecting an abnormal condition based on monitoring, for example, pressures in the transport climate control circuit. The method 900 then proceeds to 950.

At 950, once the main controller portion disables operation of the transport climate control system, the processor then sends the monitored current data indicating the amount of current drawn by the compressor from the high voltage three-phase AC power source via each of the three phase lines to the main controller portion. In some embodiments, the processor can also send the monitored current data indicating the amount of current provided by the high voltage three-phase AC power source via each of the three phase lines to the main controller portion. In some embodiments, the processor can also send a status message with information regarding a potential cause of the abnormal condition (e.g., an overcurrent condition, an incorrect phase sequence, a current imbalance, a single phasing condition, an overload condition, a damaged contactor condition, etc.). The method 900 then proceeds to 955.

At 955, the main identifies what abnormal condition(s) occurred based on the monitored current data received at 950. The abnormal condition(s) that can be identified based on the monitored current data received indicating the amount of current drawn by the compressor can include, for example, a) detecting an incorrect phase sequence connection to the compressor (e.g., reverse rotation of the compressor 725) based on, for example, improper contactor wiring, b) detecting a single phasing condition associated with, for example, a poor connection to the compressor (e.g., stuck contactor, open wire, etc.), c) a current imbalance between the three phases, d) an overload condition, etc. The abnormal condition(s) that can be identified based on the monitored current data received indicating the amount of current provided by the high voltage three-phase AC power source can include, for example, a) detecting a single phasing condition associated with, for example, a poor connection between the high voltage three-phase AC power source and one or more of the high voltage transport climate control components (e.g., one or more electric heat exchanger heaters, the compressor a RESS charger, one or more fans/blowers, etc.), etc. The abnormal condition(s) that can be identified based on the monitored current data received indicating the amount of current provided by the high voltage three-phase AC power source in combination with the monitored current data received indicating the amount of current drawn by the compressor can include, for example, a) detecting connection status of each of the high voltage transport climate control components (e.g., stuck contactor, open wire, etc.), b) indirectly detecting a single phasing condition associated with, for example, a poor connection with one or more of the high voltage transport climate control components, c) overloading of the compressor, etc.

It will be appreciated that by disabling operation of the transport climate control system at 945 first before the main controller portion receives the monitored current data via the communication device at 950 and identifies any abnormal condition(s) at 955, the transport climate control system can prevent harmful and/or permanent damage to components of the electrical architecture (e.g., the electrical architecture 600 shown in FIG. 3) and to the high voltage components of the transport climate control system that could otherwise occur if the transport climate control system is not disabled prior to the main controller portion identifying any abnormal condition(s).

The method 900 then proceeds to 960. At 960, the main controller portion takes corrective action based on the abnormal condition(s) identified at 955. In some embodiments, corrective action can include sending a status message, for example, to a vehicle operator, an owner of cargo being transport via a transport unit with the transport climate control system, etc. In some embodiments, the status message can be displayed, for example, on a human machine interface (HMI) of the transport climate control system. In some embodiments, corrective action can include the main controller portion disabling a high voltage three-phase AC power source from powering the electrical architecture and thereby prevent high voltage exposure. In some embodiments, corrective action can include providing a user with a recommended preventive maintenance procedure using, for example, a telematics device.

Aspects:

It is noted that any of aspects 1-8 can be combined with any one of aspects 9-15.

Aspect 1. A closed loop feedback control and diagnostics system for a transport climate control system that is powered by a high voltage three-phase AC power source, the closed loop feedback control and diagnostics system comprising:

a plurality of source current sensors configured to monitor current received from the high voltage three-phase AC power source, wherein each of the plurality of source current sensors is configured to monitor current directed from a single phase of the high voltage three-phase AC power source;

a plurality of compressor current sensors configured to monitor current drawn by an electrically powered compressor of the transport climate control system, wherein each of the plurality of compressor current sensors is configured to monitor current drawn by a single phase of the electrically powered compressor;

a controller configured to receive source current signals from each of the plurality of source current sensors, configured to receive compressor current signals from each of the plurality of compressor current sensors, and configured to control operation of the transport climate control system based on the received source current signals and the received compressor current signals.

Aspect 2. The closed loop feedback control and diagnostics system of aspect 1, wherein the plurality of compressor current sensors includes only two compressor current sensors configured to monitor two phases of the current drawn by the electrically powered compressor, and wherein the controller is configured to calculate a third phase compressor current drawn by the electrically powered compressor based on the monitored two phases of the current drawn by the electrically powered compressor.

Aspect 3. The closed loop feedback control and diagnostics system of any one of aspects 1-2, wherein the plurality of source current sensors includes only two source current sensors configured to monitor two phases of the current provided by the high voltage three-phase AC power source, and wherein the controller is configured to calculate a third phase source current provided by the high voltage three-phase AC power source based on the monitored two phases of the current provided by the high voltage three-phase AC power source.

Aspect 4. The closed loop feedback control and diagnostics system of any one of aspects 1-3, wherein the plurality of compressor current sensors are compressor current transformers and wherein the plurality of source current sensors are source current transformers.

Aspect 5. The closed loop feedback control and diagnostics system of any one of aspects 1-4, wherein the transport climate control system includes a plurality of high voltage transport climate control components and the electrically powered compressor is one of the plurality of high voltage transport climate control components, and wherein the controller is configured to start each of the plurality of high voltage transport climate control components in sequence, and wherein the controller is configured to determine that a first high voltage transport climate control component of the plurality of high voltage transport climate control components is operating safely prior to starting a second high voltage transport climate control component of the plurality of high voltage transport climate control components, wherein the controller is configured to determine that the first high voltage transport climate control component is operating safely based on the received compressor current signals and the received source current signals.

Aspect 6. The closed loop feedback control and diagnostics system of aspect 5, wherein the controller is configured to calculate a power factor of current drawn by the first high voltage transport climate control component based on the received source current signals and the received compressor current signals, wherein the first high voltage transport climate control component is not the electrically powered compressor.

Aspect 7. The closed loop feedback control and diagnostics system of any one of aspects 1-6, wherein the controller is configured to adjust an opening size of an electronic throttle valve of the transport climate control system based on the received compressor current signals to control the current drawn by the electrically powered compressor.

Aspect 8. The closed loop feedback control and diagnostics system of any one of aspects 1-7, wherein the transport climate control system includes a plurality of high voltage transport climate control components and the electrically powered compressor is one of the plurality of high voltage transport climate control components, and wherein the controller is configured to identify an abnormal condition of at least one of the plurality of high voltage transport climate control components that is not the electrically powered compressor based on the received compressor current signals and the received source current signals.

Aspect 9. A method for operating a closed loop feedback control and diagnostics system for a transport climate control system that is powered by a high voltage three-phase AC power source, the method comprising:

a plurality of source current sensors monitoring current received from the high voltage three-phase AC power source, wherein each of the plurality of source current sensors monitoring current directed from a single phase of the high voltage three-phase AC power source;

a plurality of compressor current sensors monitoring current drawn by an electrically powered compressor of the transport climate control system, wherein each of the plurality of compressor current sensors monitoring current drawn by a single phase of the electrically powered compressor;

a controller receiving source current signals from each of the plurality of source current sensors;

the controller receiving compressor current signals from each of the plurality of compressor current sensors;

the controller controlling operation of the transport climate control system based on the received source current signals and the received compressor current signals.

Aspect 10. The method of aspect 9, further comprising the plurality of compressor current sensors monitoring only two of three phases of the current drawn by the electrically powered compressor; and the controller calculating a third phase compressor current drawn by the electrically powered compressor based on the monitored two phases of the current drawn by the electrically powered compressor.

Aspect 11. The method of any one of aspects 9-10, further comprising the plurality of source current sensors monitoring only two of three phases of the current provided by the high voltage three-phase AC power source; and the controller calculating a third phase source current provided by the high voltage three-phase AC power source based on the monitored two phases of the current provided by the high voltage three-phase AC power source.

Aspect 12. The method of any one of aspects 9-11, wherein the transport climate control system includes a plurality of high voltage transport climate control components and the electrically powered compressor is one of the plurality of high voltage transport climate control components, and the method further including:

the controller starting each of the plurality of high voltage transport climate control components in sequence, and the controller determining that a first high voltage transport climate control component of the plurality of high voltage transport climate control components is operating safely prior to starting a second high voltage transport climate control component of the plurality of high voltage transport climate control components, wherein the controller determining that the first high voltage transport climate control component is operating safely based on the received compressor current signals and the received source current signals.

Aspect 13. The method of aspect 12, further comprising the controller calculating a power factor of current drawn by the first high voltage transport climate control component based on the received source current signals and the received compressor current signals, wherein the first high voltage transport climate control component is not the electrically powered compressor.

Aspect 14. The method of any one of aspects 9-13, further comprising the controller adjusting an opening size of an electronic throttle valve of the transport climate control system based on the received compressor current signals to control the current drawn by the electrically powered compressor.

Aspect 15. The method of any one of aspects 9-14, wherein the transport climate control system includes a plurality of high voltage transport climate control components and the electrically powered compressor is one of the plurality of high voltage transport climate control components, and the method further including:

the controller identifying an abnormal condition of at least one of the plurality of high voltage transport climate control components that is not the electrically powered compressor based on the received compressor current signals and the received source current signals.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A closed loop feedback control and diagnostics system for a transport climate control system that is powered by a high voltage three-phase AC power source, the closed loop feedback control and diagnostics system comprising:
   a plurality of source current sensors configured to monitor current received from the high voltage three-phase AC power source, wherein each of the plurality of source current sensors is configured to monitor current directed from a single phase of the high voltage three-phase AC power source;
   a plurality of compressor current sensors configured to monitor current drawn by an electrically powered compressor of the transport climate control system, wherein each of the plurality of compressor current sensors is configured to monitor current drawn by a single phase of the electrically powered compressor;
   a controller configured to receive source current signals from each of the plurality of source current sensors, configured to receive compressor current signals from each of the plurality of compressor current sensors, and configured to control operation of the transport climate control system based on the received source current signals and the received compressor current signals.

2. The closed loop feedback control and diagnostics system of claim 1, wherein the plurality of compressor current sensors includes only two compressor current sensors configured to monitor two phases of the current drawn by the electrically powered compressor, and
   wherein the controller is configured to calculate a third phase compressor current drawn by the electrically powered compressor based on the monitored two phases of the current drawn by the electrically powered compressor.

3. The closed loop feedback control and diagnostics system of claim 1, wherein the plurality of source current sensors includes only two source current sensors configured to monitor two phases of the current provided by the high voltage three-phase AC power source, and
   wherein the controller is configured to calculate a third phase source current provided by the high voltage three-phase AC power source based on the monitored two phases of the current provided by the high voltage three-phase AC power source.

4. The closed loop feedback control and diagnostics system of claim 1, wherein the plurality of compressor current sensors are compressor current transformers and wherein the plurality of source current sensors are source current transformers.

5. The closed loop feedback control and diagnostics system of claim 1, wherein the transport climate control system includes a plurality of high voltage transport climate control components and the electrically powered compressor is one of the plurality of high voltage transport climate control components, and
   wherein the controller is configured to start each of the plurality of high voltage transport climate control components in sequence, and
   wherein the controller is configured to determine that a first high voltage transport climate control component of the plurality of high voltage transport climate control components is operating safely prior to starting a second high voltage transport climate control component of the plurality of high voltage transport climate control components, wherein the controller is configured to determine that the first high voltage transport climate control component is operating safely based on the received compressor current signals and the received source current signals.

6. The closed loop feedback control and diagnostics system of claim 5, wherein the controller is configured to calculate a power factor of current drawn by the first high voltage transport climate control component based on the received source current signals and the received compressor current signals, wherein the first high voltage transport climate control component is not the electrically powered compressor.

7. The closed loop feedback control and diagnostics system of claim 1, wherein the controller is configured to adjust an opening size of an electronic throttle valve of the transport climate control system based on the received compressor current signals to control the current drawn by the electrically powered compressor.

8. The closed loop feedback control and diagnostics system of claim 1, wherein the transport climate control system includes a plurality of high voltage transport climate control components and the electrically powered compressor is one of the plurality of high voltage transport climate control components, and
   wherein the controller is configured to identify an abnormal condition of at least one of the plurality of high voltage transport climate control components that is not the electrically powered compressor based on the received compressor current signals and the received source current signals.

9. A method for operating a closed loop feedback control and diagnostics system for a transport climate control system that is powered by a high voltage three-phase AC power source, the method comprising:
   a plurality of source current sensors monitoring current received from the high voltage three-phase AC power source, wherein each of the plurality of source current sensors monitoring current directed from a single phase of the high voltage three-phase AC power source;
   a plurality of compressor current sensors monitoring current drawn by an electrically powered compressor of the transport climate control system, wherein each of the plurality of compressor current sensors monitoring current drawn by a single phase of the electrically powered compressor;
   a controller receiving source current signals from each of the plurality of source current sensors;
   the controller receiving compressor current signals from each of the plurality of compressor current sensors;
   the controller controlling operation of the transport climate control system based on the received source current signals and the received compressor current signals.

10. The method of claim 9, further comprising the plurality of compressor current sensors monitoring only two of three phases of the current drawn by the electrically powered compressor; and
   the controller calculating a third phase compressor current drawn by the electrically powered compressor based on the monitored two phases of the current drawn by the electrically powered compressor.

11. The method of claim 9, further comprising the plurality of source current sensors monitoring only two of three phases of the current provided by the high voltage three-phase AC power source; and the controller calculating a third phase source current provided by the high voltage three-phase AC power source based on the monitored two phases of the current provided by the high voltage three-phase AC power source.

12. The method of claim 9, wherein the transport climate control system includes a plurality of high voltage transport climate control components and the electrically powered compressor is one of the plurality of high voltage transport climate control components, and the method further including:

the controller starting each of the plurality of high voltage transport climate control components in sequence, and the controller determining that a first high voltage transport climate control component of the plurality of high voltage transport climate control components is operating safely prior to starting a second high voltage transport climate control component of the plurality of high voltage transport climate control components, wherein the controller determining that the first high voltage transport climate control component is operating safely based on the received compressor current signals and the received source current signals.

13. The method of claim 12, further comprising the controller calculating a power factor of current drawn by the first high voltage transport climate control component based on the received source current signals and the received compressor current signals, wherein the first high voltage transport climate control component is not the electrically powered compressor.

14. The method of claim 9, further comprising the controller adjusting an opening size of an electronic throttle valve of the transport climate control system based on the received compressor current signals to control the current drawn by the electrically powered compressor.

15. The method of claim 9, wherein the transport climate control system includes a plurality of high voltage transport climate control components and the electrically powered compressor is one of the plurality of high voltage transport climate control components, and the method further including:

the controller identifying an abnormal condition of at least one of the plurality of high voltage transport climate control components that is not the electrically powered compressor based on the received compressor current signals and the received source current signals.

* * * * *